United States Patent
Jain

(10) Patent No.: US 7,609,040 B1
(45) Date of Patent: Oct. 27, 2009

(54) POWER SUPPLY AND RELATED CIRCUITS

(75) Inventor: Praveen K. Jain, Kingston (CA)

(73) Assignee: CHiL Semiconductor Corporation, Tewksbury, MA (US)

( * ) Notice: Subject to any disclaimer, the term of this patent is extended or adjusted under 35 U.S.C. 154(b) by 331 days.

(21) Appl. No.: 11/701,877

(22) Filed: Feb. 2, 2007

Related U.S. Application Data

(63) Continuation-in-part of application No. 11/261,661, filed on Oct. 31, 2005, now Pat. No. 7,456,618, and a continuation-in-part of application No. 11/261,660, filed on Oct. 31, 2005, now Pat. No. 7,489,117.

(51) Int. Cl.
G05F 1/40 (2006.01)
(52) U.S. Cl. .................. 323/283; 323/276
(58) Field of Classification Search ......... 323/272, 323/276, 282, 283, 284, 285, 351
See application file for complete search history.

(56) References Cited

U.S. PATENT DOCUMENTS

| | | | | | |
|---|---|---|---|---|---|
| 5,309,344 | A | * | 5/1994 | Smith | 363/20 |
| 5,555,165 | A | | 9/1996 | Vinciarelli | 363/95 |
| 5,731,731 | A | | 3/1998 | Wilcox et al. | 327/403 |
| 5,946,210 | A | | 8/1999 | Montminy et al. | 700/97 |
| 6,188,209 | B1 | | 2/2001 | Poon et al. | 323/255 |
| 6,225,795 | B1 | | 5/2001 | Stratakos et al. | 323/283 |
| 6,285,175 | B1 | | 9/2001 | Massie | 323/290 |
| 6,307,356 | B1 | | 10/2001 | Dwelley | 323/282 |
| 6,351,108 | B1 | | 2/2002 | Burstein et al. | 323/283 |
| 6,498,467 | B1 | | 12/2002 | Stratakos | 323/284 |
| 6,545,450 | B1 | | 4/2003 | Ledenev et al. | 323/272 |
| 6,593,724 | B1 | | 7/2003 | Chen | 323/283 |
| 6,696,823 | B2 | | 2/2004 | Ledenev et al. | 323/272 |
| 6,696,825 | B2 | | 2/2004 | Harris et al. | 323/282 |
| 6,696,882 | B1 | | 2/2004 | Markowski et al. | 327/531 |
| 6,703,814 | B2 | | 3/2004 | Pohlman et al. | 323/272 |
| 6,791,302 | B2 | | 9/2004 | Tang et al. | 323/272 |
| 6,803,752 | B1 | | 10/2004 | Chen | 323/282 |
| 6,809,504 | B2 | | 10/2004 | Tang et al. | 323/274 |
| 6,819,537 | B2 | | 11/2004 | Pohlman et al. | 361/64 |
| 6,828,765 | B1 | | 12/2004 | Schultz et al. | 323/284 |
| 6,897,715 | B2 | | 5/2005 | Barber, Jr. et al. | 327/541 |
| 6,909,265 | B2 | | 6/2005 | Tang | 323/274 |
| 6,943,535 | B1 | | 9/2005 | Schiff | 323/246 |
| 6,965,502 | B2 | | 11/2005 | Duffy et al. | 361/18 |
| 6,975,494 | B2 | | 12/2005 | Tang et al. | 361/64 |

* cited by examiner

*Primary Examiner*—Adolf Berhane
(74) *Attorney, Agent, or Firm*—Chapin IP Law, LLC; Paul P. Kriz, Esq.

(57) ABSTRACT

A controller circuit in a power supply system is configured to simultaneously control both a voltage regulator circuit and a dynamic power supply circuit. The controller circuit monitors voltage produced by the voltage regulator circuit. The voltage regulator circuit conveys power from a voltage source to a dynamic load such as a microprocessor, whose power consumption can change rapidly change during operation. Depending on a state (e.g., current value, trend, etc.) of the monitored voltage applied to the load by the voltage regulator circuit, the controller circuit can initiate activation of the dynamic power supply circuit in parallel with the voltage regulator circuit to selectively supply additional power to the load. Supplying additional power to the dynamic load during heavy load conditions prevents the regulated voltage supplied to the load from falling below a threshold value.

34 Claims, 20 Drawing Sheets

POWER SUPPLY AND RELATED CIRCUITS

RELATED APPLICATIONS

This application is a continuation in part of earlier filed U.S. patent application Ser. No. 11/261,661, entitled "DIGITAL CONTROLLER FOR A VOLTAGE REGULATOR MODULE," filed on Oct. 31, 2005 now U.S. Pat. No. 7,456,618, the entire teachings of which are incorporated herein by this reference.

This application is also a continuation in part of earlier filed U.S. patent application Ser. No. 11/261,660, entitled "DYNAMIC CONVERSION CIRCUIT FOR A VOLTAGE REGULATOR MODULE," filed on Oct. 31, 2005 now U.S. Pat. No. 7,489,117, the entire teachings of which are incorporated herein by this reference.

FIELD OF INVENTION

The invention generally relates to a voltage regulator module (VRM), and particularly to control methods and devices for enhancing the transient response of a VRM under dynamic load conditions.

BACKGROUND

A voltage regulator module (VRM) is used to regulate a DC voltage supplied to a load, such as microprocessor. A VRM includes a power converter, such as a DC-DC converter, and may include other components such as a controller for controlling operation of the power converter. An example of a DC-DC converter is a synchronous buck converter, as shown in FIG. 1, which has minimal components, and therefore is widely used in VRM applications. In microprocessor applications, the input voltage to the VRM is typically $12V_{DC}$. The output voltage may be $5.0V_{DC}$, $3.3 V_{DC}$, or lower.

As microprocessors become more advanced, required supply voltages become lower. Supply voltages are expected to be as low as $0.5 V_{DC}$ in the near future, which will require currents up to 200 A or more. Currently, the CPU of a typical personal computer operates at 3 GHz, and operating frequencies are expected to reach 10 GHz in the near future. A consequence of the low supply voltage and high clock frequency is the high slew rate (di/dt) of the load current at power up. For example, when a microprocessor wakes from sleep mode to full operating mode, the step of the output current may be as high as 200 A, with a slew rate of 1,000 A/μs or higher. The slew rate may be over 1,000 A/μs in future designs. The voltage supplied to current microprocessors is required to be regulated within 2%, and 1% for future VRMs ("VRM 9.1 DC-DC converter design guidelines", Intel Order Number 298646-001, January 2002). The absolute value of such voltage regulation is currently 30 mV and 10 mV for future designs. Such tight voltage regulation is required to maintain normal operation of CMOS transistors in the microprocessor under all conditions. For instance, under worst case (high slew rate of the output current) conditions, the output voltage should not drop by more than 30 mV to avoid abnormal operation of the CPU. However, the voltage drop of VRMs based on existing designs may be so large that the output voltage regulation limit may easily be exceeded.

Various VRM topologies and control methods have been proposed in an attempt to satisfy the transient response requirements of microprocessors. However, such designs are not well-suited to the harsher dynamic requirements of next generation microprocessors.

For example, simply increasing the output capacitance can reduce the output voltage ripple, and also help maintain the output voltage during a sudden load change. However, for a single phase $1.5 V_{DC}/25$ A VRM, for instance, a design that can meet the steady state and transient voltage regulation specification typically requires at least 5,000 μF output capacitance. Such filter capacitors are bulky and expensive. It is estimated that for a VRM supplying $0.5 V_{DC}$ at 100 A, the required output capacitance would be more than 10,000 μF, and should have considerably lower equivalent series inductance (ESL) and equivalent series resistance (ESR) to be effective during load transients. FIG. 2 (top curve only) shows such a relationship between the output capacitance and load current for typical prior VRMs. Although multiphase topology, which helps to reduce output capacitance, may be used for applications when the load current exceeds 20 A, the value of the capacitance is still exceedingly high at high load current.

Reducing the output inductance of a buck converter can improve its dynamic response. However, the inductance can not be reduced unbounded, otherwise the output voltage ripple will increase above acceptable limits (e.g., above 10 mV for next generation microprocessors). The increased voltage ripple will in turn reduce the room for the output voltage drop during load dynamics. In addition, a larger ripple current through the filter inductor implies a larger RMS current through the power switches, which will reduce the overall efficiency of the VRM under steady state operation. Moreover, even though the inductance can be reduced for a faster dynamic response, it is not enough to provide adequate response speed for future microprocessors if the output capacitance is required to be small to reduce cost and to satisfy size and volume constraints.

Multiphase interleaved VRM topology provides two or more power converters in parallel and shares the same output capacitors among converters. In each of the power converters (or each phase), the filter inductor can be smaller than that of a single phase VRM to achieve a faster dynamic response. The large output voltage ripple in each phase due to the small inductance can be cancelled by the ripple of other phases. The more phases are in parallel, the smaller the ripple will be, but at the expense of increased circuit cost. Multiphase topology can therefore enhance the output current capability of a VRM. However, if the output current can be provided by a single phase VRM or a VRM with fewer phases, then adopting a multiphase topology or adding extra phases in parallel solely for the purpose of reducing the ripple voltage adds considerable complexity, size, and cost. More importantly, it is very difficult for a conventionally-controlled multiphase VRM to achieve the dynamic response required by future microprocessors, without having very large output capacitance.

Current mode control has a faster dynamic response than that of conventional voltage mode control in situations where only a small perturbation such as a small load change occurs. However, its dynamic performance is not superior to that of voltage mode control when a large transient occurs. More importantly, in current mode control, the current is detected by employing a sensing resistor or a current transformer. However, for an output current of 100 A or higher, it would be impractical to use a resistor to accurately and efficiently sense the current. On the other hand, a current transformer is bulky and the sensed current must be averaged, resulting in further increases in the reaction time and drop in the output voltage when a large load step happens.

The voltage droop control method takes advantage of the upper and lower limits of the VRM output voltage to gain more room for dynamic responses. When the load current is low, the reference voltage is set to be higher than the nominal value but still within the specified upper limit. When a load step-up happens, the output voltage will drop but will have more room to drop than if it were starting from the nominal value. When the load current is high, the reference voltage is set to be low; thus when a load step-down happens, the output voltage has more room for the overshoot. However, this small room is far from being enough to handle the harsh dynamic requirements of next generation microprocessors. Moreover, the voltage droop control method also requires current sensing, which again is not very practical, as discussed above.

Operating the power converter at a very high frequency will improve the dynamic response of a VRM having a very small output capacitance. However, design of an efficient power converter operating at a very high frequency is difficult. Further, the efficiency of a power converter decreases eventually to an unacceptable or unsatisfactory level as its operating frequency increases. In general, increasing the switching frequency of a power converter solely for the purpose of improving the dynamic performance is not an optimum solution.

A stepping inductor method for fast transient response of switching converters is disclosed in U.S. Pat. No. 6,188,209, issued Feb. 13, 2001 to Poon et al. Relative to the basic buck converter, this design requires significantly more circuit components, which may be difficult and expensive to implement in a multiphase interleaved VRM, because all of the components need to be repeated for each phase. Moreover, the control circuit for load transients is analog based and the output voltage is compared to fixed hysteresis reference voltages to trigger and terminate the transient operation of the converter independently of the load current conditions. This implies that the transient circuit works the same way for a 25%, 50%, and 100% load step, for instance. Therefore, the voltage response during a load transient is not regulated and may exceed the specified limits of the output voltage during many load conditions.

A transient override circuit is proposed in U.S. Pat. No. 6,696,882, issued Feb. 24, 2004 to Markowski et al. This circuit detects the load voltage level to trigger a transient operation mode of the VRM. In transient operation mode, the power switch of a buck converter is forced to be turned on, and the synchronous power switch of the buck converter is turned off, to override the current through the output inductor. However, the circuit and control method are analog based, and, importantly, are not able to regulate the output voltage during the transient.

Peterchev et al. ("Architecture and IC implementation of a digital VRM controller", *IEEE Transactions on Power Electronics*, 18 (1):356-364, 2003) relates to a digital controller for a dc-dc switch mode converter. However, the reference focuses on digital control only for normal steady state operation. Saggini et al. ("An innovative digital control architecture for low-voltage, high current dc-dc converters with tight voltage regulation", *IEEE Transactions on Power Electronics*, 19 (1):210-218, 2004) addresses digital control for improving the transient response of a VRM. However, this reference teaches a variable frequency control method in combination with voltage droop control, which requires accurate sensing of the load current. U.S. Patent Publication No. 2004/015098, published Aug. 5, 2004, relates to a digital controller for a VRM; however, some of the operations carried out by this controller are effected through analog circuitry.

SUMMARY

According to one aspect of the invention there is provided a digital controller for a switching DC-DC converter of a voltage regulator module, comprising: a voltage sensor for sensing an output voltage of the DC-DC converter and generating a corresponding digital signal; means for determining an expected output current of the DC-DC converter from the digital signal; and means for generating at least one gate signal when: (i) the expected output current is greater than an operating current; and/or (ii) the sensed output voltage is less than a threshold output voltage; wherein the at least one gate signal is provided to at least one switch of the DC-DC converter, the at least one gate signal turning on a first switch that increases current output of the DC-DC converter and/or turning off a second switch that limits output current of the DC-DC converter.

In one embodiment, the means for generating at least one gate signal may generate a gate signal for each switch in the DC-DC converter.

The DC-DC converter may be of an isolated or a non-isolated topology, such as boost, buck, or buck-boost. In a preferred embodiment, the DC-DC converter is a buck converter.

In one embodiment, the voltage regulator module may include a dynamic conversion circuit, and the means for generating at least one gate signal generates a gate signal for at least one switch in the dynamic conversion circuit. In another embodiment the means for generating at least one gate signal may generate a gate signal for each switch in the dynamic conversion circuit and for at least one switch in the DC-DC converter.

The at least one gate signal may be a pulse train of higher frequency than a switching frequency of the DC-DC converter. The at least one gate signal may be pulse width modulated.

In a further embodiment, two or more switching DC-DC converter circuits may be included in the voltage regulator module, wherein the means for generating at least one gate signal comprises means for generating a gate signal for at least one switch of each DC-DC converter. The voltage regulator module may include a dynamic conversion circuit, and the means for generating at least one gate signal may comprise means for generating a gate signal for each switch in the dynamic conversion circuit and for at least one switch of each DC-DC converter. The two or more DC-DC converters may be of an isolated or a non-isolated circuit topology. Preferably, at least one DC-DC converter is a buck converter.

According to another aspect of the invention there is provided a method for digitally controlling a voltage regulator module including a switching DC-DC converter, comprising: sensing an output voltage of the DC-DC converter and generating a corresponding digital signal; determining an expected output current of the DC-DC converter from the digital signal; generating at least one gate signal when: (i) the expected output current is greater than an operating current; and/or (ii) the sensed output voltage is less than a threshold output voltage; and providing the at least one gate signal to at least one switch of the DC-DC converter of the voltage regulator module; wherein the at least one gate signal turns on a first switch that increases current output of the DC-DC converter and/or turns off a second switch that limits output current of the DC-DC converter.

In one embodiment, the method may further comprise generating a gate signal for each switch in the DC-DC converter.

In one embodiment, the voltage regulator module may include a dynamic conversion circuit, the method further comprising generating a gate signal for a switch of the dynamic conversion circuit. In another embodiment the method may further comprise generating a gate signal for a switch in the dynamic conversion circuit and for at least one switch of the DC-DC converter.

In accordance with the method, the DC-DC converter may be of an isolated or a non-isolated topology, such as buck, boost, or buck-boost. In a preferred embodiment, the DC-DC converter is a buck converter.

In one embodiment, the method may further comprise generating the gate signal as a pulse train of higher frequency than a switching frequency of the DC-DC converter. The method may further comprise pulse width modulating the gate signal.

In another embodiment, the voltage regulator module may include two or more DC-DC converters, the method further comprising generating at least one gate signal for at least one switch of each DC-DC converter. The method may further comprise generating a gate signal for each switch in each DC-DC converter. The voltage regulator module may include a dynamic conversion circuit, and may further comprise generating a gate signal for a switch in the dynamic conversion circuit. The method may further comprise generating a gate signal for at least one switch in each DC-DC converter and for a switch in the dynamic conversion circuit. Each DC-DC converter may be of an isolated or a non-isolated circuit topology, such as buck, boost, or buck-boost. At least one DC-DC converter can be a buck converter.

In some embodiments of the method, determining an expected output current of the DC-DC converter from the digital signal may comprise calculating the output current from a linear or a non-linear function. In other embodiments, determining an expected output current of the DC-DC converter from the digital signal may comprise determining a corresponding current value from a look-up table.

According to another aspect of the invention there is provided a voltage regulator module comprising at least one DC-DC power converter circuit and a digital controller as described herein. The voltage regulator module may further comprise a dynamic conversion circuit as described herein.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION OF PREFERRED EMBODIMENTS

Figure 1:
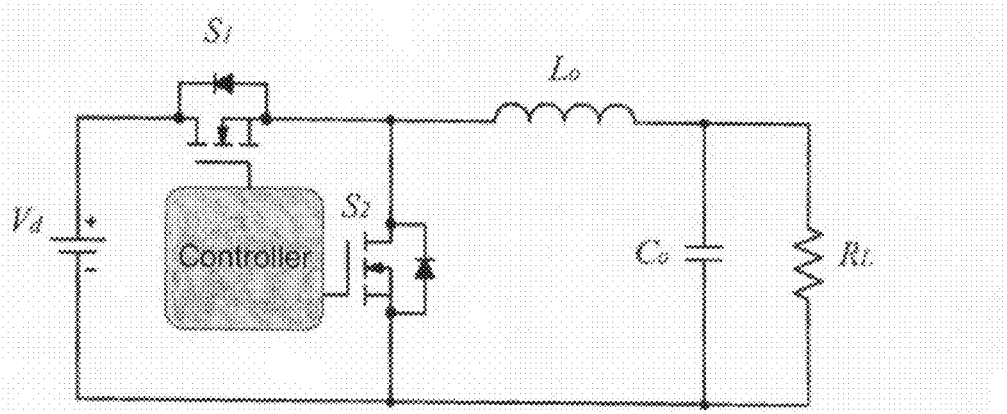
FIG. 1 is a schematic diagram of a prior art single phase synchronous buck converter.
Figure 2:
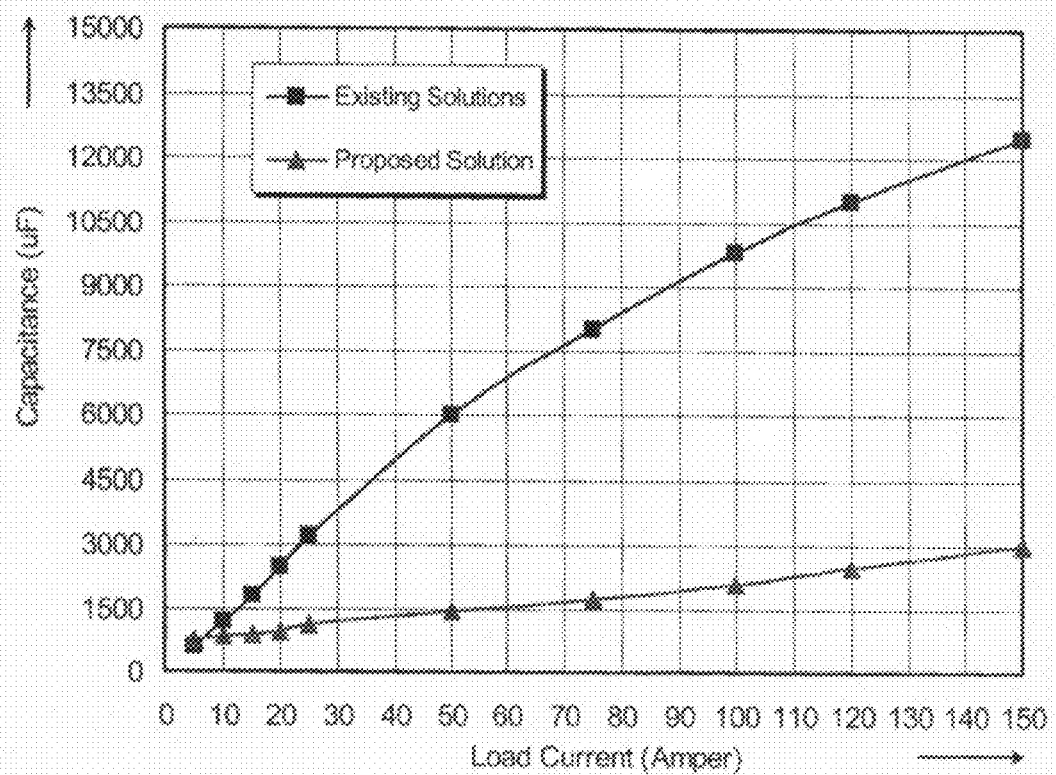
FIG. 2 is a plot of estimated output capacitance versus load current for the invention compared with prior art VRMs.

Digital control has many advantages over analog control in a power converter. One of the most important advantages relates to the flexibility of digital control. Various control schemes that may be difficult to implement in analog control become feasible when digital control is applied. However, no previous digital controllers for VRMs provide satisfactory solutions for transient load conditions, particularly the transients expected to be presented by future microprocessors.

A digital controller as described herein provides a novel solution to the control of a VRM during transients, by employing voltage sensing of the VRM output voltage. By sensing minute changes in the output voltage, and relating the output voltage to the corresponding required output current (e.g., predicting the output current from the sensed output voltage), a digital controller as described herein may respond quickly to sudden demands for current that would otherwise result in a substantial drop in output voltage, compromising performance of the load. As exemplified by the embodiments described herein, the digital controller of the invention has been optimized to work in conjunction with either a dynamic conversion circuit and a power converter, such as a buck converter, or with only a power converter, as use of the digital controller to enhance performance of any power converter may be accomplished with only minor modifications to the embodiments described herein.

By implementing the digital controller and the control method of the invention, increasing the switching frequency of the DC-DC converter is unnecessary, because an increased switching frequency does not further improve the dynamic response of the converter. The switching frequency may be kept below 500 kHz to achieve a higher efficiency and at the same time maintain a very fast dynamic response with greatly reduced output capacitance. The greatly reduced output capacitance enables the use of ceramic capacitors, which are smaller in size and have a much smaller equivalent series resistance (ESR). Consequently, a VRM according to the invention will require less space on a PCB and cost will be reduced. Further, the digital implementation offers great flexibility, including external programming, such that no analog components need to be substituted under different conditions. Factors such as tolerance, temperature, and aging of components have no effect on components such as the compensator due to the digital implementation.

According to one aspect of the invention there is provided a voltage regulator module, comprising a power conversion circuit, an optional dynamic conversion circuit, and a digital controller. The load may be of various devices that require tight output voltage regulation. A microprocessor is an example of such a load due to its large current consumption and the extreme load transients it presents to the VRM. For these reasons, a microprocessor will be considered as the load for the VRM in this disclosure. The power conversion circuit of the VRM is power converter, typically a DC-DC voltage converter such as a synchronous buck converter, but is not limited thereto. Other isolated and non-isolated power converter circuits, such as, for example, boost and buck-boost, may also be used. The power converter may be single phase or multiphase interleaved to regulate the output voltage, depending on how much load current is needed.

The dynamic conversion circuit is a circuit capable of responding rapidly to sudden changes in the load connected to the VRM output. A sudden change in the load, such as an increase in current consumption, results in a decrease in the output voltage from its nominal value. Such a load transient represents a deviation in output current of the power converter from its operating current (i.e., steady-state current). The dynamic conversion circuit responds to such transient decreases in output voltage by transiently increasing the output current of the DC-DC converter, thereby preventing further decreases in output voltage. Thus, the dynamic conversion circuit substantially improves the voltage regulation of the VRM under dynamic load conditions. An example of a suitable dynamic conversion circuit is set forth in our co-pending U.S. patent application Ser. No. 11/261,660, incorporated herein by reference in its entirety. Such a dynamic conversion circuit may be used with any isolated or non-isolated switching DC-DC converter, such as, for example, buck, boost, or buck-boost, single phase or multiphase interleaved, for any load requiring tight voltage regulation under both steady-state and transient conditions.

Figure 3:
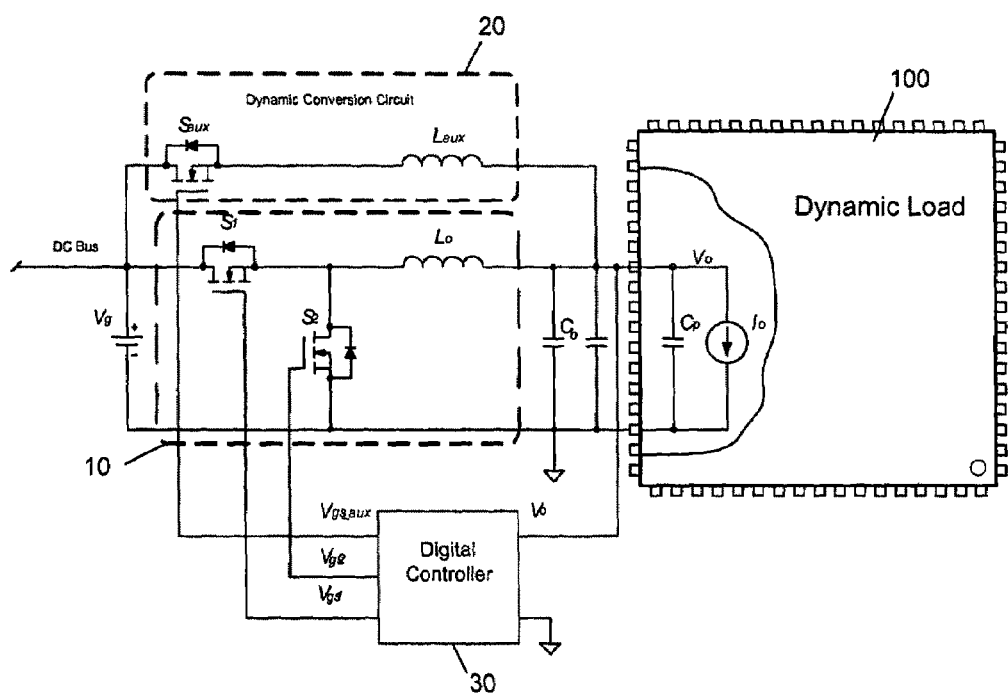
FIG. 3 is a schematic diagram of a single phase VRM circuit including a digital controller according to an embodiment of the invention.

In the embodiment shown in FIG. 3, a VRM comprises a buck converter 10, an optional dynamic conversion circuit 20, and a digital controller 30, and the VRM is connected to a dynamic load 100 (e.g., a microprocessor). The power converter 10 includes switching power devices $S_1$ and $S_2$, and an output filter inductor $L_o$ and capacitor $C_o$. The dynamic conversion circuit 20 includes an auxiliary power switch $S_{aux}$ in series with an auxiliary inductor $L_{aux}$. The dynamic conversion circuit is connected in parallel with the power converter 10. In an alternative embodiment the dynamic conversion circuit 20 may be connected in parallel with only the output inductor $L_o$ of the power converter 10. In either case, the same configuration of digital controller 30 may be used. Further, other configurations of a dynamic conversion circuit may also be used. In various embodiments, the digital controller 30 may be used to control the gate signal of the power switches $S_1$ and/or $S_2$, and/or the auxiliary switch $S_{aux}$ during transients.

Figure 4:
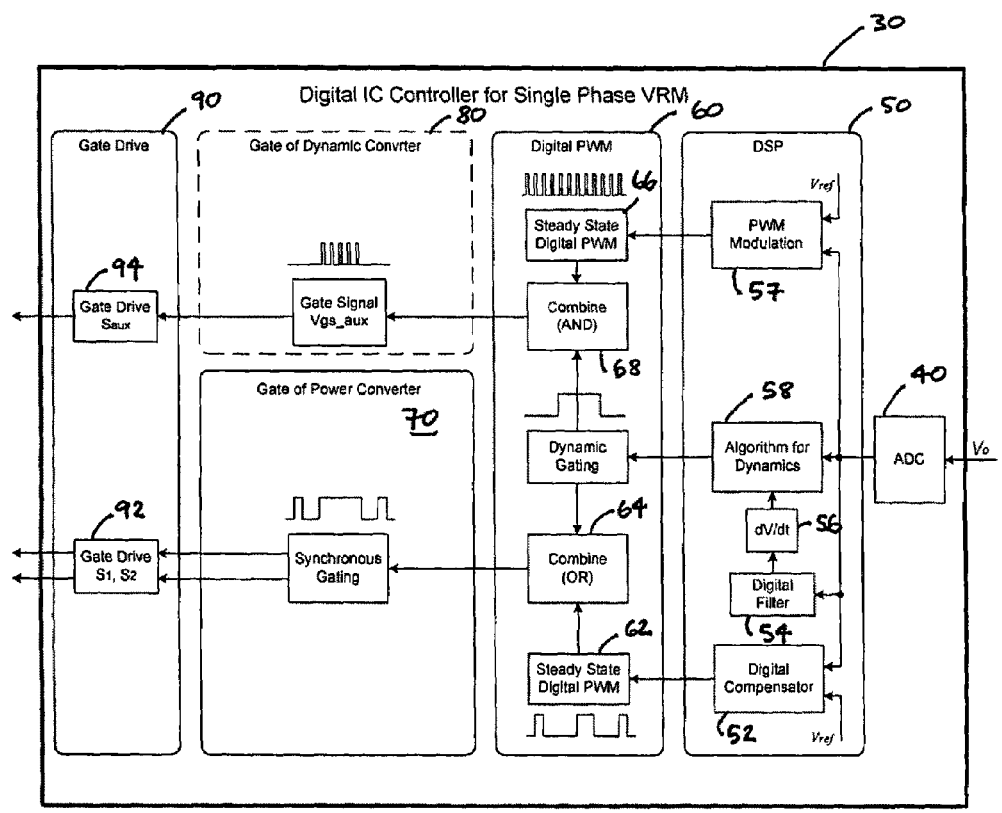
FIG. 4 is a block diagram of a digital controller for a single phase VRM according to the invention.

A block diagram of an embodiment of the digital controller 30 is shown in FIG. 4. This embodiment is for a single phase VRM having a single power converter, for example a buck converter, and an optional dynamic conversion circuit. The digital controller includes six major function blocks:

1) An analog-to-digital converter (ADC) 40 which senses the output voltage at the load and converts the analog voltage signal into digitized bits. The speed and resolution (e.g., number of bits) of the ADC may be specified according to the required performance and the design considerations. For example, we have found that a 12-bit, 125 MSPS (mega samples per second), ADC, part number AD9433-125, available from Analog Devices, is suitable.

2) A digital signal processing (DSP) block 50, which receives the output from the ADC 40 and processes the sampled output voltage based on an algorithm, an example of which is discussed below with respect to FIG. 6;

3) A digital pulse width modulation (PWM) block 60, which receives output from the DSP block 50 and generates a digitized PWM gate signals for the switches of the power converter, and optionally for an auxiliary circuit if used;

4) A gate of power converter block 70, which generates the synchronous gate signals for the two switches of the power converter;

5) An optional gate of dynamic converter block 80, which generates the gate signal for the switch $S_{aux}$ of the optional dynamic conversion circuit; and 6) A gate drive block 90, which drives the gates of the switches of the power converter and optional dynamic conversion circuit with the synchronized PWM signals.

Preferably the digital controller is implemented as an integrated circuit. However, the ADC and the gate drive block may not be necessarily integrated into the digital controller device; that is, either one or both of these blocks may be physically discrete from such an integrated digital controller device.

Figure 5:
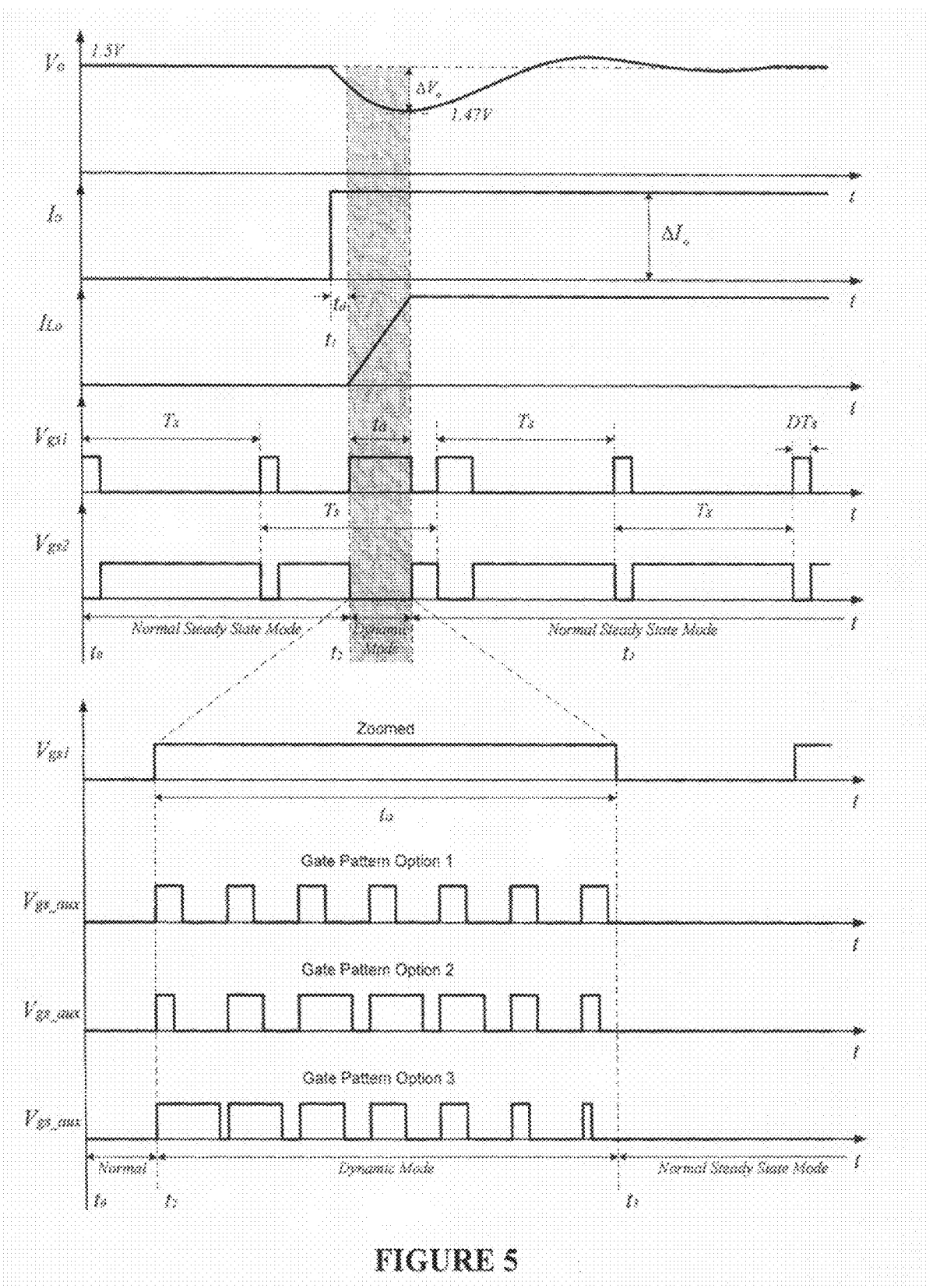
FIG. 5 is a plot of single phase VRM waveforms during the steady state and during a transient state according to the control method of the invention.

Operation of the digital controller will now be described with reference to FIGS. 4 and 5. In normal steady state operation of the power converter or when the load transient is within certain range, the pulse width of the gate signal is determined by the sensed load voltage, the nature of the power converter, and the way the system is compensated. The sampled load voltage is compared with a reference voltage in the DSP block 50 shown in FIG. 4. The discrete error signal is compensated by the compensator 52, which may be a digitally-implemented compensator such as, for example, a proportional integral derivative (PID), PI, Type II, Type III, or proportional/differential (PD) lead compensator. The compensator is selected according to the power converter requirements, based on voltage mode control. The synchronous gate signals of one phase of the converter during steady state are shown in FIG. 5 at time $t_0$-$t_2$ and $t_3$-$\infty$, Normal Steady State Mode. The frequency of the gate signal is always fixed. The pulse width or duty cycle of the gate signal is also stabilized during steady state operation. At time $t_i$ in FIG. 5, a load transient occurs. After a delay of $t_d$, at time $t_2$, the converter enters Dynamic Mode. The delay $t_d$ is due to the sampling and processing time of the digital controller. Once a load transient occurs, the duty cycle of the synchronous gate signal is adjusted, determined by how the system is compensated, and relates to factors such as the crossover frequency and the gain of the compensator. However, without the digital controller of the invention, the change in the duty cycle of the gate signal is not sufficient to handle a dramatic load change. Under such circumstances the occurrence of the next gate pulse is limited by the switching frequency of the power converter, and does not occur fast enough to transfer power to the output and minimize the output voltage drop during a load transient.

In the DSP block 50 in FIG. 4, the sampled load voltage is sent to a digital filter 54 to filter out noise and then is processed at 56 to obtain the derivative of the output voltage. The derivative of the output voltage is sent to the PWM function 57 for further processing. The algorithm for dynamic function block 58 determines when the dynamic mode will be triggered and terminated. The steady state PWM gating and the dynamic gating generated in the digital PWM block 60 are combined to form the gate signal for one phase, which will then be shifted for multiphase switching power devices. This combined signal is thus for steady state operation and dynamic operation when a transient happens.

Figure 6:
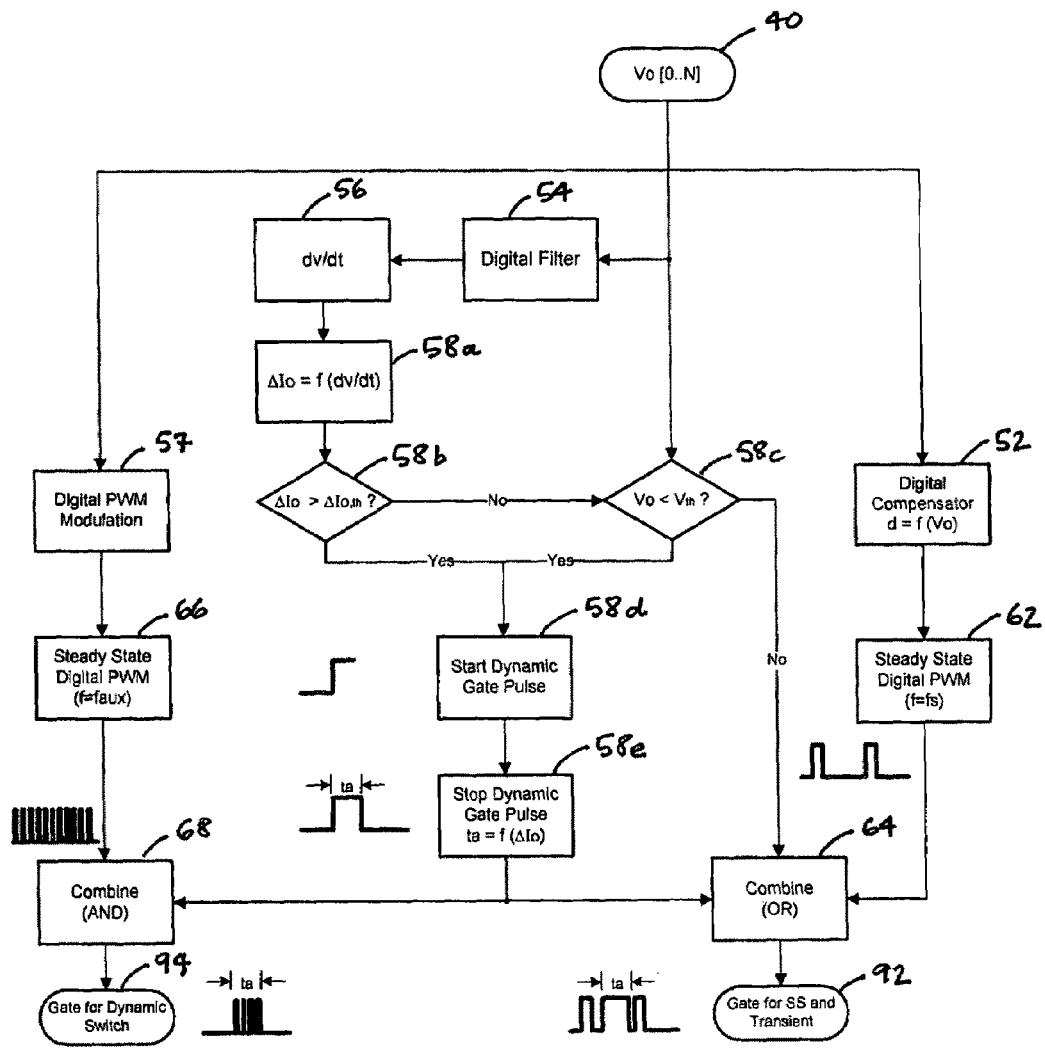
FIG. 6 is a flow chart of the control algorithm of an embodiment of a digital controller according to the invention.

The dynamic gate pattern is generated according to the process given in the flow chart shown in FIG. 6, where reference numerals corresponding to those in FIG. 4 indicate like steps. In the flow chart, the sampled voltage is filtered by a digital filter 54 to remove noise, and then is processed at 56 to obtain the derivative of the sampled voltage.

Figure 10:
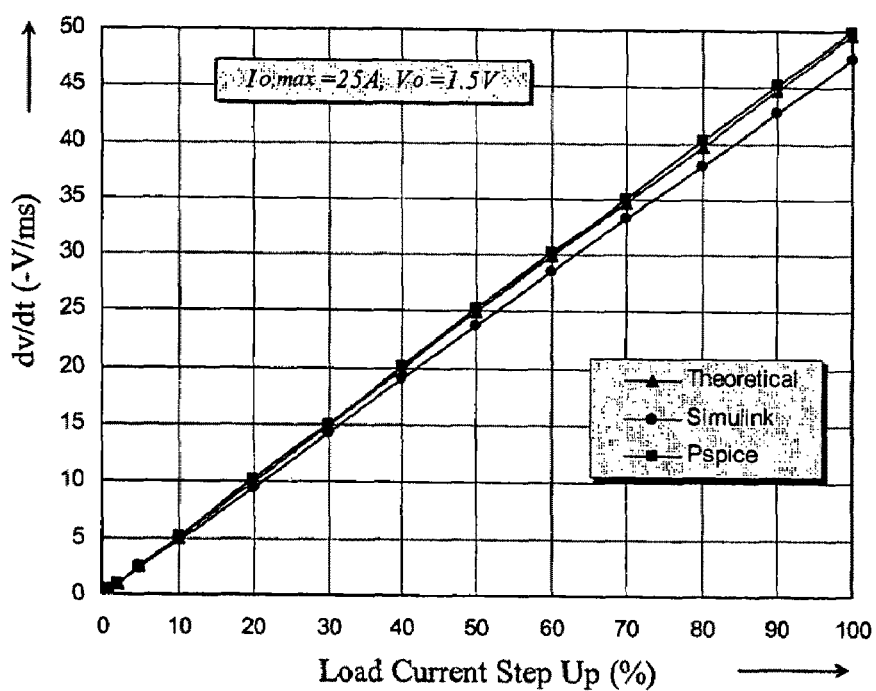
FIG. 10 is a plot of the load current change $\Delta I_o$ as a function of the output voltage slew rate dv/dt according to embodiments herein.

In one embodiment, the algorithm for dynamics 58 uses the derivative of the sampled voltage to calculate, at 58a, the change in load current $\Delta I_o$ according to a linear or non-linear function (e.g., algebraic, trigonometric, exponential) (see equation (1)). The function is based on characteristics such as the output inductance, capacitance, equivalent series resistance (ESR), switching frequency, input/output voltage, and the parameters of the compensator. For example, the voltage vs. current relationship derived from equation (1) when f is a linear function is plotted in FIG. 10. This plot shows that once the derivative of the output voltage is obtained, the load step can be predicted.

$$\Delta I_o = f(dV_o/dt) \quad (1)$$

In another embodiment, rather than calculate the change in output current, the algorithm for dynamics stores data relating to possible output currents for various output voltages, and looks up the appropriate output current for any given sensed voltage. The advantages of such a look-up table approach are improved speed and the ability to implement functions which might be difficult to model mathematically (e.g., using curve-fitting approximations).

Once the derivative of the output voltage exceeds a certain value, indicating that the load current step will exceed a certain threshold value, the algorithm for dynamics 58 (FIGS. 4 and 6) will initiate a pulse for dynamic. Specifically, at steps 58b and 58c of FIG. 6, if the load current increase exceeds a threshold value, and/or the voltage drop exceeds a threshold value, the dynamic gate pulse will be started. However, if both the output voltage drop and the load current step do not exceed their given threshold values, the dynamic gate pulse will not be initiated, in which case the combined gate signal is the gate signal from the path of the steady state PWM for the main switch in the flow chart of FIG. 6.

The dynamic gate pulse remains high for a certain period of time. Theoretically, when the current through the output inductor $L_o$ reaches the value that the output current should step to (e.g., according to equation (1)), the dynamic gate pulse should be turned off. However, in accordance with the invention it is not necessary to measure the current through the inductor to determine when to turn off the dynamic gate pulse. Rather, it is only necessary to turn off the dynamic gate pulse after a period of time $t_a$ equal to that required for the output current to rise to the predicted value (e.g., according to equation (1)). The time $t_a$ is calculated by the algorithm for dynamics 58 of the DSP block 50 of the digital controller. The time $t_a$ is a function of one or more parameters of the power converter such as, for example, the output inductance, capacitance, equivalent series resistance (ESR) of the output capacitor, switching frequency, input/output voltage, and parameters of the compensator, and a function of the load current step. Equation (2) reveals the relationships to obtain the time $t_a$.

$$t_a = \frac{\Delta I_0 \cdot L_0}{V_g - V_0} = \frac{f(dV_0/dt) \cdot L_0}{V_g - V_0} \quad (2)$$

As shown in FIGS. 4 and 6, the dynamic gate pulse of duration $t_a$, determined at 58e, is combined at 64 with the steady state PWM to form the gate signal of the power converter switch for both steady state and transient situations. The combination process is similar to an OR logic function. The waveform of the combined gate signals generated at 92 is shown in the flow chart in FIG. 6 and in FIG. 5. Thus, during the dynamic mode, once a load transient is detected, the switch $S_1$ in FIG. 3 will be turned on and kept on for a period of time $t_a$, calculated by the digital controller, while the switch $S_2$ will be kept off during this period of time. Thus, with the digital controller, the gate pulse starts in time, and the pulse width is not limited by the bandwidth of the closed control loop and is wide enough to supply the current from the input to the output through the filter inductor $L_o$ to help maintain the output voltage during the transient.

The optional dynamic conversion circuit may also be activated by the digital controller during the load transient. When switch $S_1$ is turned on and switch $S_2$ is turned off for a time period of $t_a$, the switch $S_{aux}$ of the dynamic conversion circuit is turned on and off by the gate signal generated at 94. It is noted that the inductor $L_{aux}$ in the dynamic conversion circuit has a substantially smaller value than that of $L_o$, such that the power transferred from the input to the output of the VRM is further accelerated. Moreover, turning $S_{aux}$ of the dynamic conversion on and off may comprise modulating (e.g., PWM) the gate of $S_{aux}$ during a load transient. A PWM modulation block for the auxiliary switch is shown in FIGS. 4 and 6, and may provide a suitable pattern of gate switching such as, for example, those shown in FIG. 5 and described below.

The first gate pattern of $S_{aux}$ (option I in FIG. 5) switches $S_{aux}$ at a fixed switching frequency much higher than that of the main power converter circuit. For example, the switching frequency of $S_{aux}$ may be 2 to 10 times, 2 to 100 times, or higher, than the switching frequency of the power converter, as may be possible to achieve with available technology. The pulse width of the gate signal is modulated as a constant, predetermined by the digital controller.

The second gate pattern of $S_{aux}$ (option 2 in FIG. 5) also switches $S_{aux}$ at a fixed frequency much higher than that of the main power converter circuit. The gate signal is pulse width modulated based on voltage mode control. The output voltage of the VRM is sensed and compared with the reference voltage. The error between the sensed output voltage and the reference voltage is compensated by a compensator similar to the compensator of the main power circuit, but with a larger gain. The pulse width of the gate is varied according to how the loop is compensated. For example, the loop may be compensated by a Type III compensator with a high gain.

The third gate pattern of $S_{aux}$ (option 3 in FIG. 5) also switches $S_{aux}$ at a fixed frequency much higher than that of the main power circuit. The pulse width of the gate signal is predefined to be large initially and then decreases linearly as a function of time. The decreasing rate of the duty cycle is also predefined or calculated by the digital controller.

The PWM modulated signal for the auxiliary switch $S_{aux}$ is combined with the dynamic gate pulse at 68 to form the gate signal for $S_{aux}$. The combination process is similar to an AND logic function, as shown in FIGS. 4 and 6.

Figure 7:
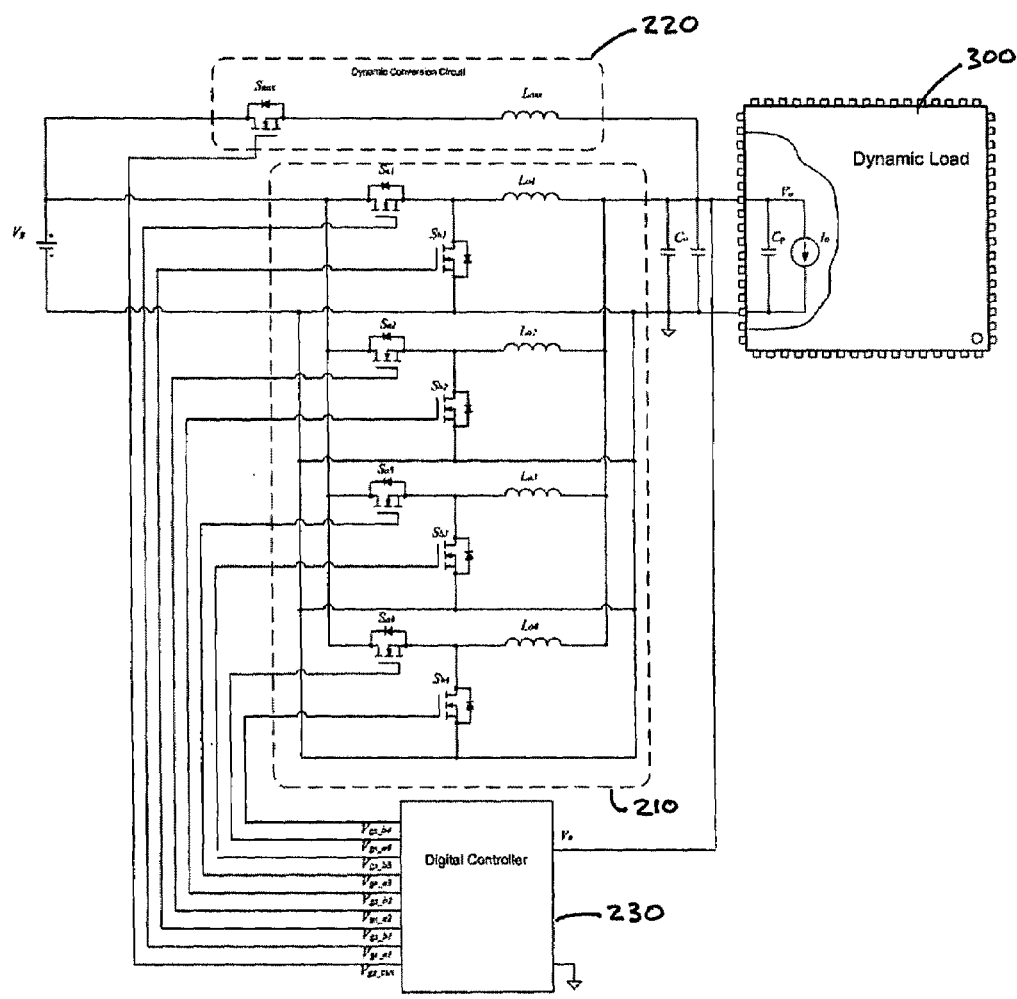
FIG. 7 is a schematic diagram of a multiphase interleaved VRM with a dynamic conversion circuit and a digital controller according to the invention.

In a second embodiment, shown in FIG. 7, the invention relates to a multiphase interleaved VRM with a dynamic conversion circuit and a digital controller. FIG. 7 shows a multiphase interleaved VRM with four power converter phases, although more or fewer phases are possible, depending on the amount of output current required. Shown in the embodiment of FIG. 7 are the main components of the interleaved VRM: the four power converter phases 210, the dynamic conversion circuit 220, and the digital controller 230. In this example, the load 300 is a microprocessor. The switches $S_{a1}$, $S_{b1}$ and the inductor $L_{o1}$ form the first phase of the multiphase interleaved power converter, each parallel phase being a synchronous buck converter. Other power converters, such as boost, buck-boost, isolated, and non-isolated could also be used. All four phases share the same output capacitor $C_o$. The auxiliary power switch $S_{aux}$ and inductor $L_{aux}$ form the optional dynamic converter of the VRM, which is connected in parallel with the four parallel power converters.

Figure 8:
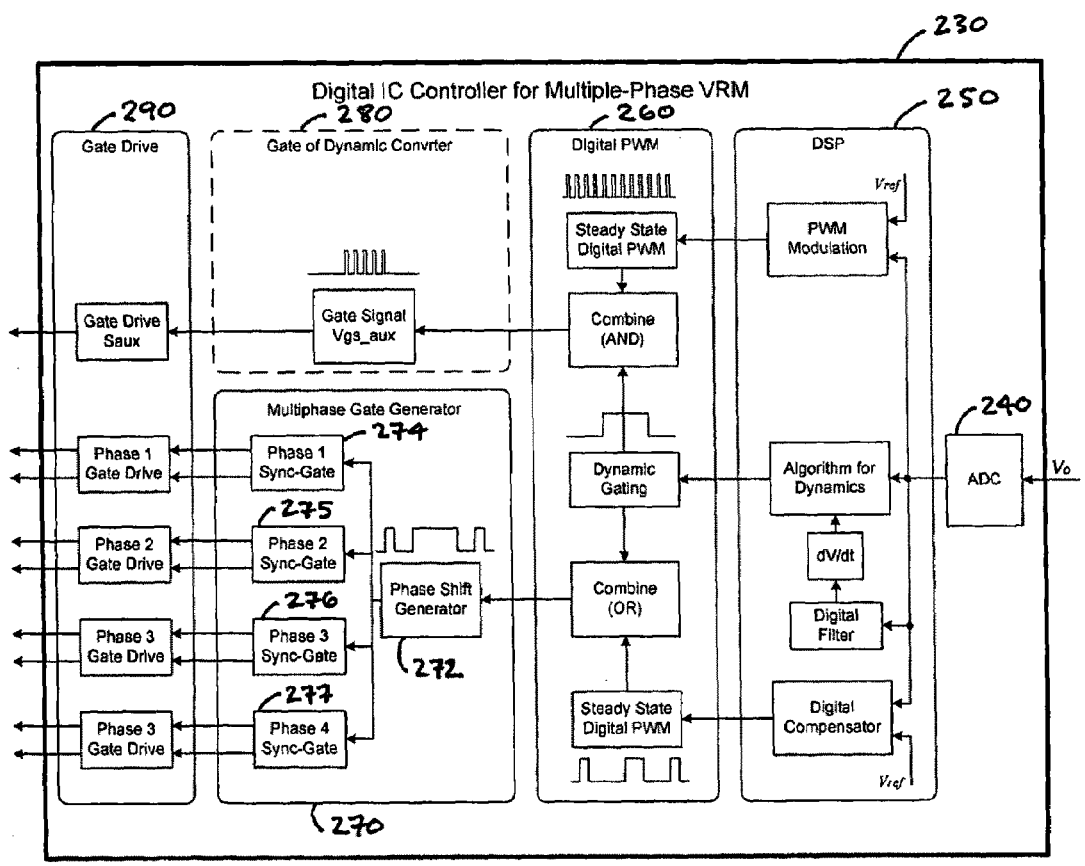
FIG. 8 is a block diagram a digital controller for a multiphase VRM embodiment.

The digital controller 230 for the interleaved VRM is shown in the block diagram of FIG. 8. The digital controller 230 has the same components and functions in the same way as the digital controller 30 in the single phase VRM described above (FIG. 4), except that the gate signal generation portion is now a multiphase gate generator 270, which generates the gate signals for paralleled buck converters. The multiphase gate generator block 270 includes a phase shift generator 272 for receiving the gate signal from the digital PWM, and four synchronous gating circuits 274 to 277, one for each of the four phases. Each synchronous gating circuit output is fed to a corresponding gate drive circuit in the gate drive block 290. The gate drive block 290 drives and sends the phase-shifted PWM gate signals to the power switches of each paralleled branch of the power converter. Optionally, it also drives and sends the gate signal to the auxiliary switch of the dynamic conversion circuit. Operation of the digital controller is substantially the same as for the single phase embodiment (see FIG. 6), in that the steady state PWM gating and the dynamic gating generated in the digital PWM block 260 are combined to form the gate signal for one phase. However, in the multiphase embodiment, this gate signal is then phase shifted by the phase shift generator 272 for multiphase switching power converters. Also, as in the single phase embodiment, the period $t_a$ at which to turn off the dynamic gate pulse may be calculated by the DSP block 250 of the digital controller. The time $t_a$ is a function of buck converter parameters such as output inductance, output capacitance, ESR of the output capacitor, switching frequency, input/output voltage, parameters of the compensator, as well as the load current step. Equation (3) describes the relationship to obtain the time $t_a$.

$$t_a = \frac{\Delta I_0 \cdot L_0}{4 \cdot (V_g - V_0)} = \frac{f(dV_0/dt) \cdot L_0}{4 \cdot (V_g - V_0)} \quad (3)$$

Figure 9:
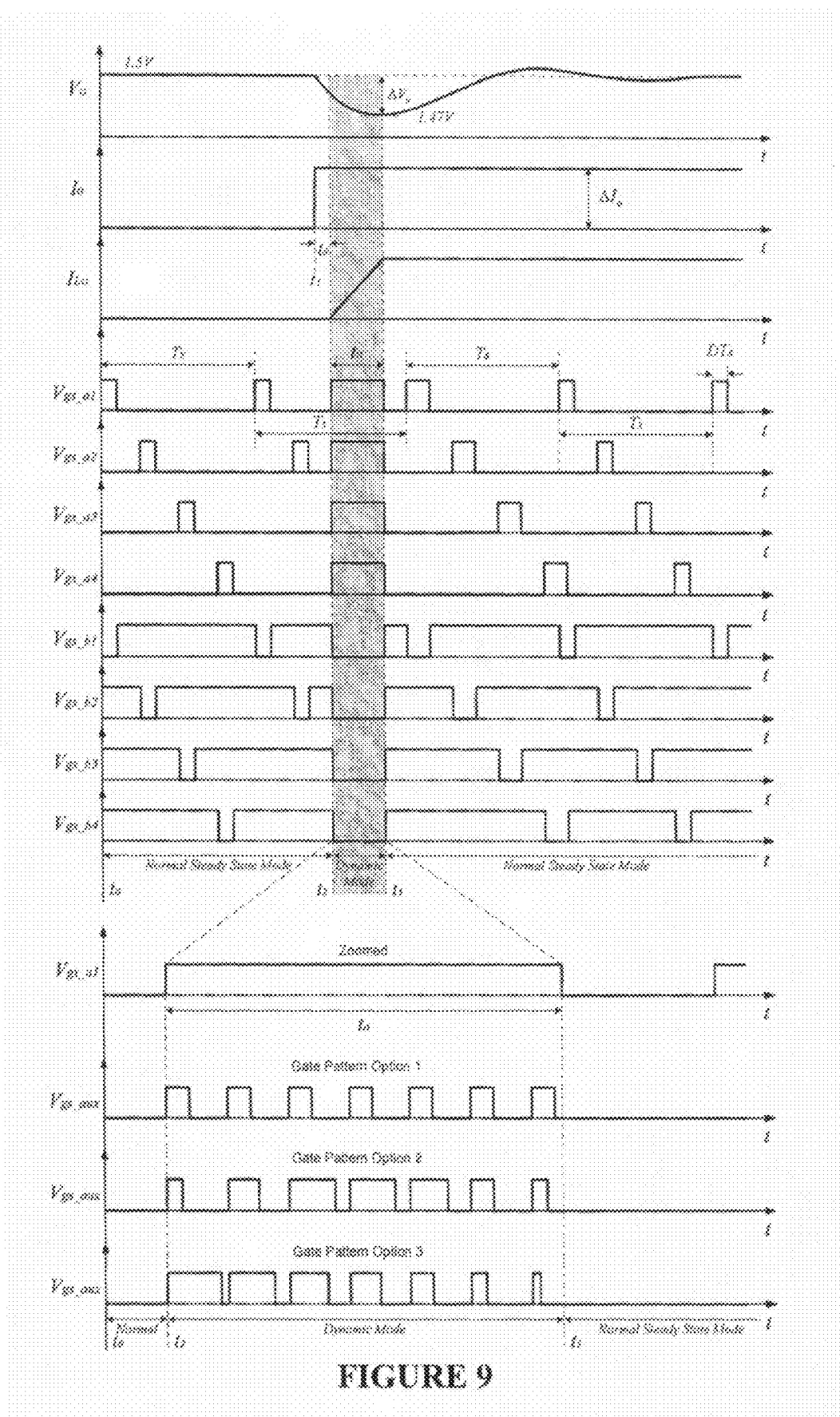
FIG. 9 is a plot of multiphase VRM waveforms during steady state and during a transient state according to the control method of the invention.

The synchronous gate signals of one phase of the converter during steady state are shown in the period referred to as Normal Steady State Mode ($t_0$-$t_2$ and $t_3$-$\infty$) in FIG. 9. The frequency of the gate signal is always fixed. The pulse width or duty cycle of the gate signal is also stabilized during steady state operation. At time $t_1$ in FIG. 9, a step load occurs. After a delay of $t_d$, at time $t_2$, the converter enters Dynamic Mode. The delay $t_d$ is due to the sampling and processing time of the digital controller. Once a load transient occurs, the increment of the duty cycle of the synchronous gate signal is determined by how the system is compensated, and relates to factors such as the crossover frequency and the gain of the compensator.

During Dynamic Mode, the switches $S_{a1}$, $S_{a2}$, $S_{a3}$, and $S_{a4}$ are turned on and kept on for a duration of time $t_a$, as calculated by the digital controller, while the switches $S_{b1}$, $S_{b2}$, $S_{b3}$, and $S_{b4}$ are kept off during this period of time. Thus the gate pulse starts in time and the pulse width will not be limited by the bandwidth of the closed control loop and will be wide enough to supply the current from the input to the output through the filter inductors $L_{o1}$, $L_{o2}$, $L_{o3}$, and $L_{o4}$ to help maintain the output voltage during the transient.

The optional dynamic conversion circuit is also activated by the digital controller during the load transient. When switches $S_{a1}$, $S_{a2}$, $S_{a3}$, and $S_{a4}$ are turned on and switches $S_{b1}$, $S_{b2}$, $S_{b3}$ and $S_{b4}$ are turned off for a time period of $t_a$, the switch $S_{aux}$ of the dynamic conversion circuit is turned on and off. In various embodiments the switch $S_{aux}$ may be modulated according to a desired gate signal drive pattern, three examples of which are shown in FIG. 9 as options 1 to 3. Options 1 to 3 are the same as those shown in FIG. 5 and described above with respect to the single phase VRM embodiment.

The invention is further illustrated by way of the following non-limiting example.

EXAMPLE

Figure 11:
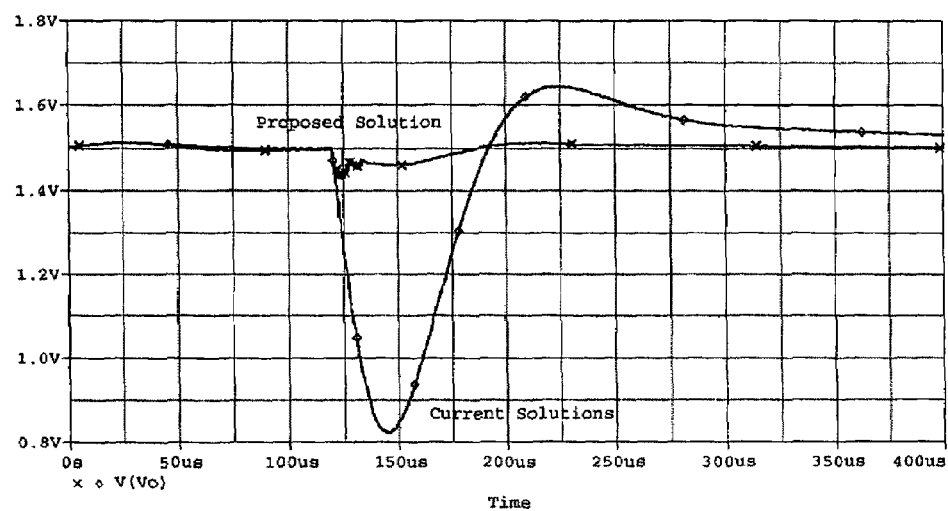
FIG. 11 is a plot showing the results of a simulation comparing the output voltage waveforms of a VRM of the invention and a conventional voltage mode controlled VRM during a load transient, in which $V_g=12\ V_{DC}$, $V_o=1.5\ V$, $I_o=25\ A$, $C_o=500\ \mu F$, $f_S=250\ kHz$, and the load steps from 0.5 A to 25 A according to embodiments herein.

A voltage regulator module based on a buck converter and including a digital controller as described above and a dynamic conversion circuit was simulated in PSPICE v. 9.0 and its performance evaluated with respect to a VRM based on a typical buck converter. The input and output voltages of the two VRMs was 12 Vdc and 1.5 Vdc respectively, and the switching frequency of the two circuits was 250 kHz. The rated output current was A and the load transient was from 0.5 A to 25 A, at a slew rate of 1000 A/µs. The results of the simulation are shown in FIG. 11, where it can be seen that the voltage drop of the VRM of the invention was less than 10% of that of the typical VRM. According to the simulation, to avoid exceeding a 70 mV output voltage drop at a 100% load current transient (25 A), an output capacitance of only 500 µF was required. In contrast, the conventional voltage mode controlled single phase VRM needed at least 5000 µF output filter capacitance. This is an approximately 6-fold reduction in output capacitance, which represents substantial savings in space on the printed circuit board, and ultimately in cost.

Figure 12:
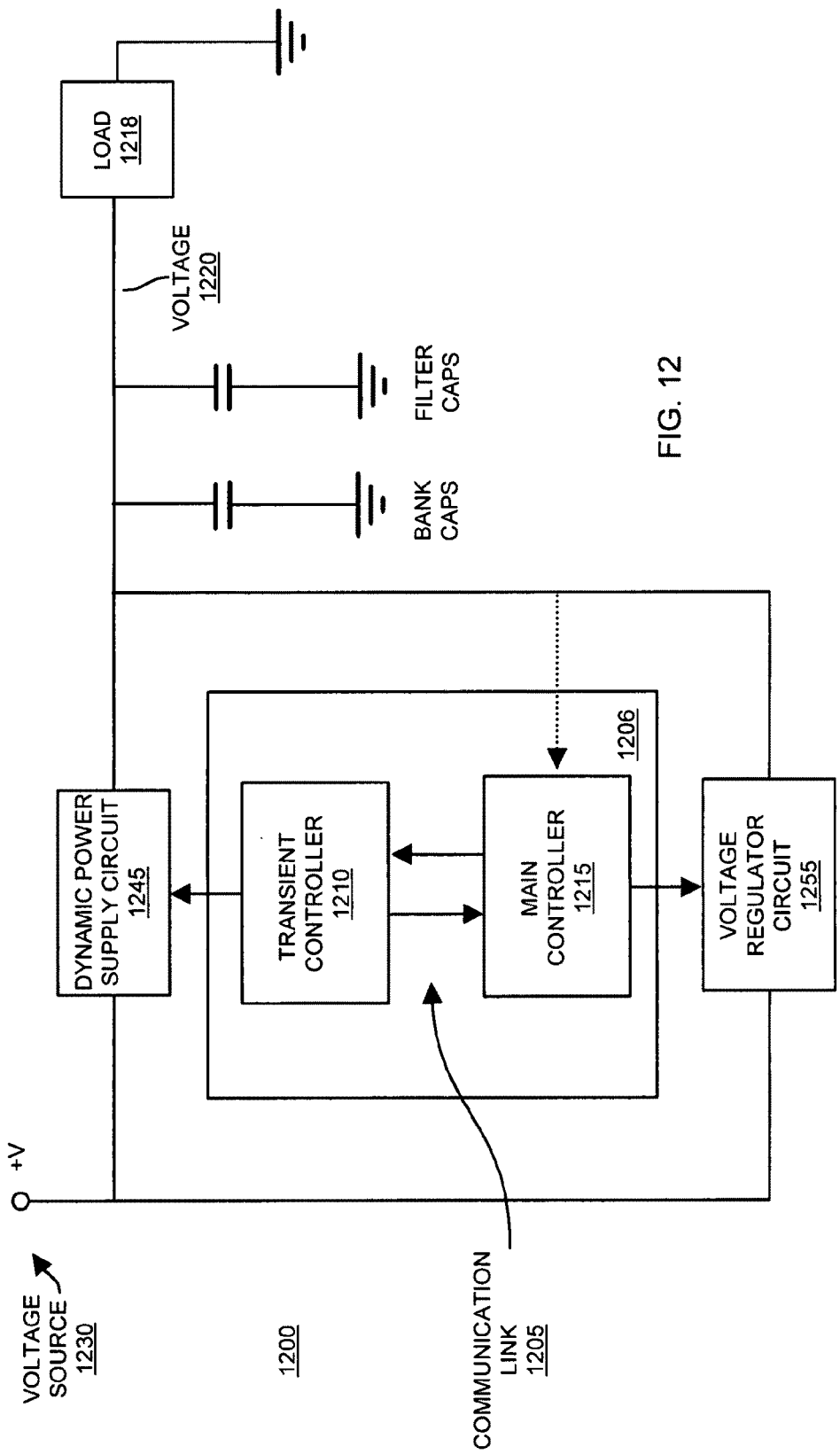
FIG. 12 is an example diagram of a power supply system including a main controller and transient controller according to embodiments herein.

FIG. 12 is an example diagram of a power supply system 1200 according to embodiments herein. As shown, power supply system 1200 includes a controller circuit 1206 that generates signals for controlling dynamic power supply circuit 1245 and voltage regulator circuit 1255 (see also FIG. 13). Dynamic power supply circuit 1245 can include elements such as one or more switches, inductors, capacitors, etc. to convey power from voltage source 1230 to load 1218. Voltage regulator circuit 1255 can include elements (see FIG. 13) such as one or more switches, inductors, capacitors, etc. to convey power from voltage source 1230 (or other power source) to load 1218. Controller circuit 1206 includes transient controller 1210 and main controller 1215. Transient controller 1210 of controller circuit 1206 generates control signals to control dynamic power supply circuit 1245.

Main controller 1215 of controller circuit 1206 generates control signals to control voltage regulator circuit 1255.

In one embodiment, the transient controller 1210 (and corresponding dynamic power supply circuit 1245) provides faster response to correct deviations in output voltage 1220 than main controller 1215 (and corresponding voltage regulator circuit 1255). In other words, the dynamic power supply circuit 1245 can deliver power more quickly to load 1218 than one or a combination of multiple power converter circuits associated with voltage regulator circuit 1255.

In one embodiment, a combination of the transient controller 1210 and main controller 1215 together control both a voltage regulator circuit 1255 and a dynamic power supply circuit 1245 as described herein. For example, the main controller 1215 of controller circuit 1206 can monitor voltage 1220 produced by the voltage regulator circuit 1255 that is used to convey power from voltage source 1230 to load 1218 (e.g., a dynamic load such as a microprocessor system). During non-transient conditions, the main controller 1215 and corresponding voltage regulator circuit 1255 may be able to provide enough power to load 1218 without activation of dynamic power supply circuit 1245 so that voltage 1220 does not fall outside of an acceptable range.

Depending on a state (e.g., current value, trend, etc.) of the monitored voltage (e.g., voltage 1220), the transient controller 1210 of controller circuit 1206 can initiate activation of the dynamic power supply circuit 1245 in parallel with the voltage regulator circuit 1255 to selectively supply additional power to the load while voltage regulator circuit 1255 also provides power to load 1218. In other words, transient controller 1210 and main controller 1215 can simultaneously generate corresponding control signals to the dynamic power supply circuit 1245 and voltage regulator circuit 1255 so that voltage regulator circuit 1255 produces a constant voltage such as 1.5 Volts DC, both during transients and under steady-state conditions.

In one embodiment, either one of or both the transient controller 1210 and the main controller 1215 of controller circuit 1206 monitor the value of voltage 1220 and can adjust their corresponding outputted control signals so that voltage regulator circuit produces a substantially constant voltage, (within a limit of allowable under and over voltages,) applied to load 1218 even when the load 1218 happens to moderately increase or decrease at any given instant in time.

During non-transient conditions when power requirements are relatively steady, the transient controller 1210 reduces or eliminates an amount of power provided to load 1218 by dynamic power supply circuit 1245. In other words, the dynamic power supply circuit 1245 can be deactivated. Main controller 1215 provides appropriate control signals to voltage regulator circuit 1255 so that the voltage 1220 is maintained at substantially constant value. That is, for microprocessor to moderate changes in power needs, the main controller 1215 can react (modify its outputted control signals) to changes in demand (e.g., demanded current or power) by load 1218 such that the voltage 1220 remains at a relatively constant value in the absence of excessive transients in which current requirements suddenly change on the order of several amperes.

For more substantial changes in load 1218 (e.g., drastic load changes in which load 1218 requires substantially more current at a given instant of time), the main controller 1215 and/or voltage regulator circuit 1255 may be unable to respond fast enough to convey power from the voltage source 1230 to the load 1218. Under such circumstances, a monitor circuit (as will be discussed later in this specification) such as a transient predictor circuit associated with the controller circuit 1206 can detect when the voltage 1220 droops below a threshold value. Note that in one embodiment, the controller circuit 1206 identifies a change in current consumption by load 1218 based on changes in voltage 1220 over time. Additionally, or in alternative embodiments, the controller circuit 1206 can receive feedback (e.g., a signal) from load 1218 indicating changes in present and/or future power consumption needs and react accordingly.

In response to a more drastic voltage droop as a result of near instantaneous current demand by load 1218, the transient controller 1210 generates one or more respective control signals to activate dynamic power supply circuit 1245. For example, either or both the main controller 1215 and/or transient controller 1210 of controller circuit 1206 can be configured to sense a sudden current increase in load 1218 and initiate successive, rapid opening and closing of a respective switch (see FIG. 7 as an example) such that dynamic power supply circuit 1245 conveys power to load 1218 either in addition to or in lieu of voltage regulator circuit 1255 providing power to load 1218. Accordingly, when load 1218 suddenly requires a substantial increase in current/power, the controller circuit 1206 deploys transient controller 1210 to prevent drooping of voltage 1220 by supplementing an amount of current conveyed to load 1218. For example, in one embodiment, the controller circuit 1206 is configured to enable the dynamic power supply circuit 1245 to convey power from voltage source 1230 to the load 1218 at a same time that a switch (or switches) in the voltage regulator circuit 1255 is enabled to supply power to the load. This is also shown and discussed above with respect to FIG. 7.

Referring again to FIG. 12, note that controller circuit 1206 can include communication link 1205 enabling the transient controller 1210 and the main controller 1215 to communicate with each other. For example, the main controller 1215 can be configured to monitor voltage 1220 and provide a status of monitored voltage 1220 to transient controller 1210. As will be discussed later in this specification, the transient controller 1210 can include a transient predictor circuit that monitors information received from main controller 1215 and generates appropriate control signals to initiate activation of dynamic power supply circuit 1245 when characteristics (e.g., magnitude) of voltage 1220 indicate that the voltage regulator circuit 1255 will be unable to provide enough power to load 1218 to prevent a droop (or spike) in voltage 1220 at load 1218. In a return direction from transient controller 1210 to main controller 1215, the transient controller 1210 can communicate the occurrence of a transient condition such as an instantaneous change in current/power requirements by load 1218. In one embodiment, in response to receiving notification of the transient condition from transient controller 1210, the main controller 1215 modifies control signals driving voltage regulator circuit 1255 such as activating one or more switches to simultaneously convey power from voltage source 1230 (or other respective sources) to load 1218.

In a similar vein as discussed above for previous and future figures, note that the dynamic power supply circuit 1245 can include a switch device that sinks current or power to ground. Additionally, the voltage regulator circuit 1255 can include a switch device that sinks current to ground.

Controller circuit 1206 can also initiate activation of either or both of such current sinks when the load substantially decreases at a given instant in time to prevent voltage 1220 from exceeding a threshold value. In an instance when the current draw or power consumption of load 1218 suddenly decreases, without implementing proper measures by controller circuit 1206, the value of voltage 1220 may suddenly increase because voltage regulator circuit 1255 may be unable to react fast enough to account for the change. However, activation of one or both sink current devices associated with voltage regulator circuit 1255 and dynamic power supply circuit 1245 (based on appropriate control signals produced by controller circuit 1206) prevents the voltage 1220 from increasing above an acceptable threshold value. As previously discussed, in one embodiment, the voltage regulator circuit 1255 can react fast enough to prevent low frequency spikes on voltage 1220, whereas dynamic power supply circuit 1245 can react fast enough to prevent higher frequency voltage spikes.

Accordingly, the controller circuit 1206 can generate appropriate control signals such that voltage 1220 is maintained within an acceptable voltage range such as between 1.45 and 1.55 volts, even when there are moderate and/or substantial changes in power consumption by load 1218.

Note that in one embodiment, the load 1218 in power supply system 1200 is a microprocessor device and the dynamic power supply circuit 1245 (e.g., power boost circuit) includes a switch (e.g., element 1272) that selectively conveys power from voltage source 1230 to the microprocessor during transient conditions when the load increases and requires more current (e.g., an additional number of amperes of current) to keep the voltage 1220 at a substantially constant value.

During operation (e.g., enabling current processor power from voltage source 1230 to load 1218), the respective switch elements associated with the dynamic power supply circuit 1245 can be rapidly turned on and off at different duty cycles to control a rate of allowing current or power from voltage source 1230 to pass to the load 1218.

In addition to controlling a duty cycle associated with rapid ON and OFF switching, the inductance associated with the filter or energy storage elements (e.g., inductors associated with dynamic power supply circuit 1245 and voltage regulator circuit 1255) can be selectively controlled for increased performance. For example, as previously discussed, in one embodiment, a series inductor device associated with dynamic power supply circuit 1245 can be configured to have a lower inductance than one or more series inductor elements associated with voltage regulator circuit 1255. Accordingly, in such an embodiment, the dynamic power supply circuit 1245 is able to more quickly react to supplying extra needed current (e.g., power) to load 1218 to prevent substantial drooping of voltage 1220 because of its higher responsiveness.

Thus, one embodiment herein includes a controller circuit 1206 configured to drive the dynamic power supply circuit 1245, which has a faster response time than voltage regulator circuit 1255 (either individual phases or a collection of multiple phases) for more quickly supplying power to the load 1218. In addition to a faster response time for supplying power to load 1218 because the dynamic power supply circuit 1245 has a smaller series inductance element than voltage regulator circuit 1255, the transient controller 1210 of controller circuit 1206 can be configured to drive the dynamic power supply circuit 1245 with higher frequency switching signals. In other words, the dynamic power supply circuit 1245 can be configured to operate at a higher switching rate than the voltage regulator circuit 1255 to supply power to the load 1218.

In addition to the above embodiments, the controller circuit 1206 (e.g., a digital controller circuit) can be further configured to set the voltage regulator circuit 1255 to a given operational mode of multiple operational modes depending on whether a respective transient condition has been detected. For example, as previously discussed with respect to FIG. 7, the controller circuit 1206 can turn ON one or more corresponding switch elements associated with voltage regulator circuit 1255 such that voltage regulator circuit 1255 conveys power from voltage source 1230 to load 1218. While the voltage regulator circuit 1255 is set to this operational mode during a respective voltage droop (e.g., transient condition) detected on voltage 1220, the controller circuit 1206 initiates activation of the dynamic power supply circuit 1245 (e.g., one more DC-DC converter phases) to supply power to the load 1218 in addition to the power currently conveyed to load 1218 via voltage regulator circuit 1255.

Thus, the main controller 1215 of controller circuit 1206 can continue to generate control signals (and/or modify its outputted control signals) to control voltage regulator circuit 1255 during a transient condition and additionally activate dynamic power supply circuit 1245 when needed to prevent a droop or over-voltage condition. In one embodiment, the controller circuit 1206 only activates the dynamic power supply circuit 1245 for a predicted duration of time, $t_A$, until the voltage regulator circuit 1255 is able to compensate for a change in the load 1218. After such time, the dynamic power supply circuit 1245 can be disabled until another droop or over-voltage condition on voltage 1220 occurs.

In addition to the embodiments as discussed above, note that the transient controller circuit 1210 can be configured to reduce an amount of power delivered by the dynamic power supply circuit 1245 to the load 1218 during the transient condition when the power requirements of the load decreases. Before or during such a condition, the transient controller 1210 can convey control information to the main controller 1215 to indicate a current or future reduction in power requirements of the load 1218. The conveyed control information prompts the main controller 1215 to initiate a reduction of an amount of power delivered by the voltage regulator circuit 1255 to the load. In other words, the main controller can initiates activation of appropriate switches to sink current to ground in response to receiving the control information.

As described herein, the dynamic power supply circuit 1245 can be configured to provide power to load at a faster rate than voltage regulator circuit 1255 to account for any sudden changes in power needs. During a transient condition, the dynamic power supply circuit 1245 may initially provide enough power to prevent a droop until the main controller 1215 and corresponding voltage regulator circuit 1255 are able to "catch up" and provide the appropriate amount of power to the load 1218 so that embodiments herein dynamic power supply circuit 1245 can be disabled.

Note that transient controller 1210 and corresponding dynamic power supply circuit 1245 can be configured to sink excess power/current being delivered by the voltage regulator circuit 1255 to the load 1218 during the transient condition in which the power requirements of the load decreases to prevent a voltage spike on voltage 1220. Thus, if the voltage regulator circuit 1255 is unable to quickly reduce an amount of power/current delivered to the load and prevent an over-voltage condition, the transient controller 1210 can initiate activation of the dynamic power supply circuit 1245 to sink any excess power/current to prevent the over-voltage condition. Both circuits (e.g., the dynamic power supply circuit and voltage regulator circuit) can provide significant sink current to prevent over-voltages.

As an alternative to monitoring of voltage 1220 to detect a transient condition, note that the controller 1206 (e.g., either the transient controller 1210 and/or main controller 1215) can be configured to detect an upcoming or currently occurring transient condition based on receiving communications from the load 1218 itself, which may be a microprocessor that can predict and/or detect occurrence of the transient condition (e.g., a sudden need for increased or a decreased amount of current/power.

Figure 13:
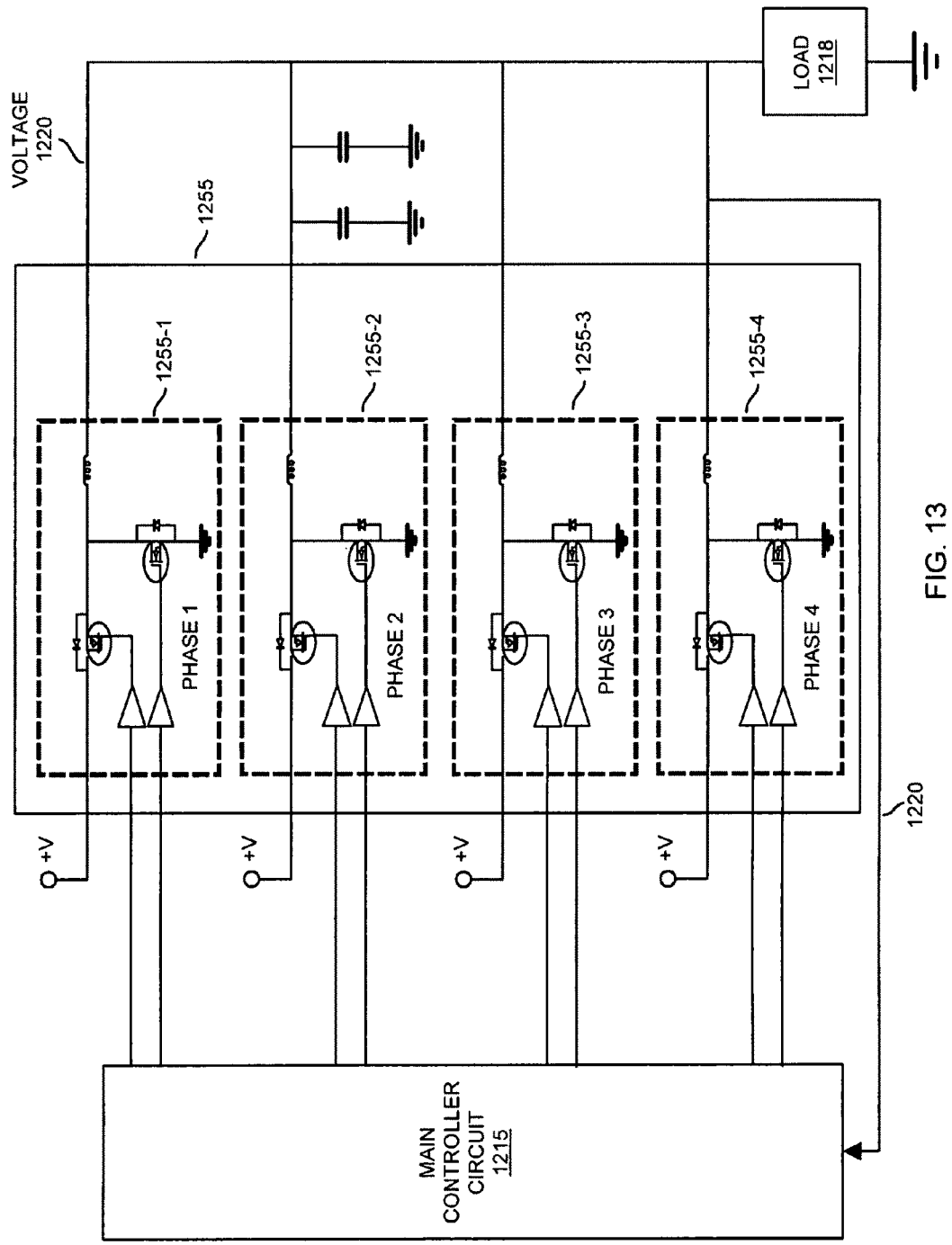
FIG. 13 is a diagram of an example circuit architecture of a voltage regulator circuit including multiple phases according to embodiments herein.

FIG. 13 is a diagram illustrating an embodiment in which the voltage regulator circuit 1255 includes multiple converter phases (e.g., voltage regulator circuit 1255-1, voltage regulator circuit 1255-2, voltage regulator circuit 1255-3, and voltage regulator circuit 1255-4) to provide power to load 1218. As previously discussed with respect to earlier figures, normal operation of each voltage regulator circuit 1255 during a non-transient condition may include selectively turning ON respective series switches at different times to convey power from voltage source to load 1218.

Figure 14:
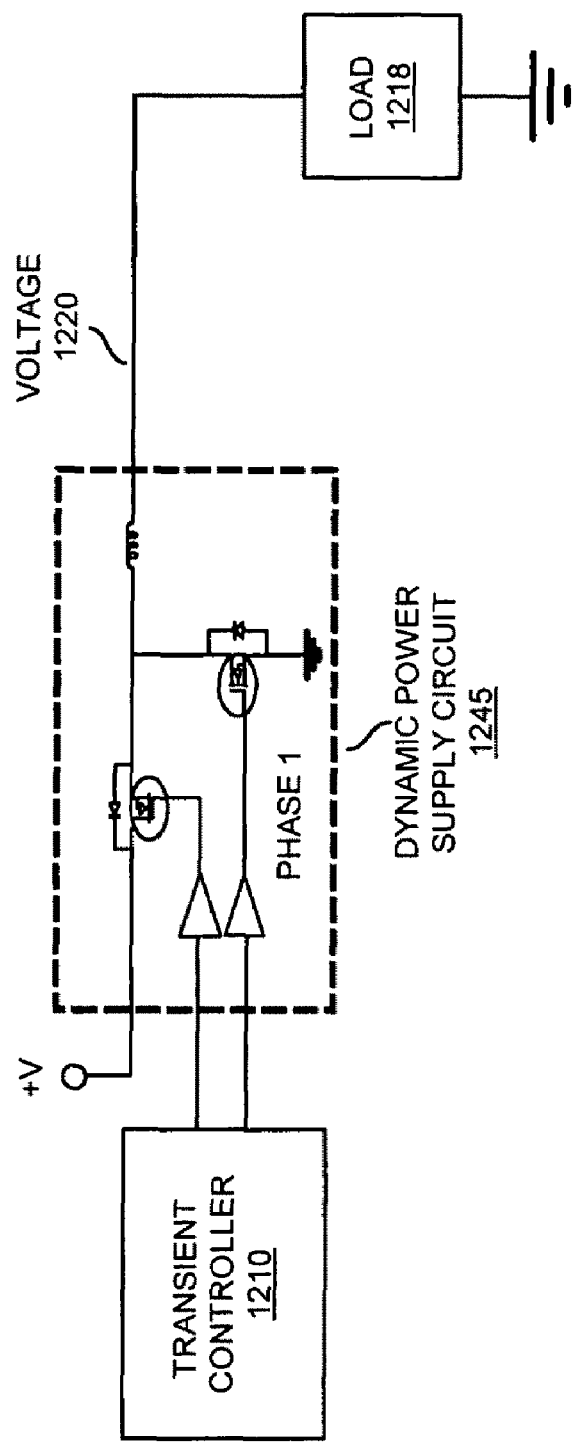
FIG. 14 is a diagram of a transient controller and corresponding dynamic power supply circuit according to embodiments herein.

FIG. 14 is a diagram of a dynamic power supply circuit 1245 including one or more series switches and inductors to control output voltage 1220 according to embodiments herein. Note that the dynamic power supply circuit 1245 can be modified to include multiple circuits of the type shown in FIG. 14 that operate in parallel.

Figure 15:
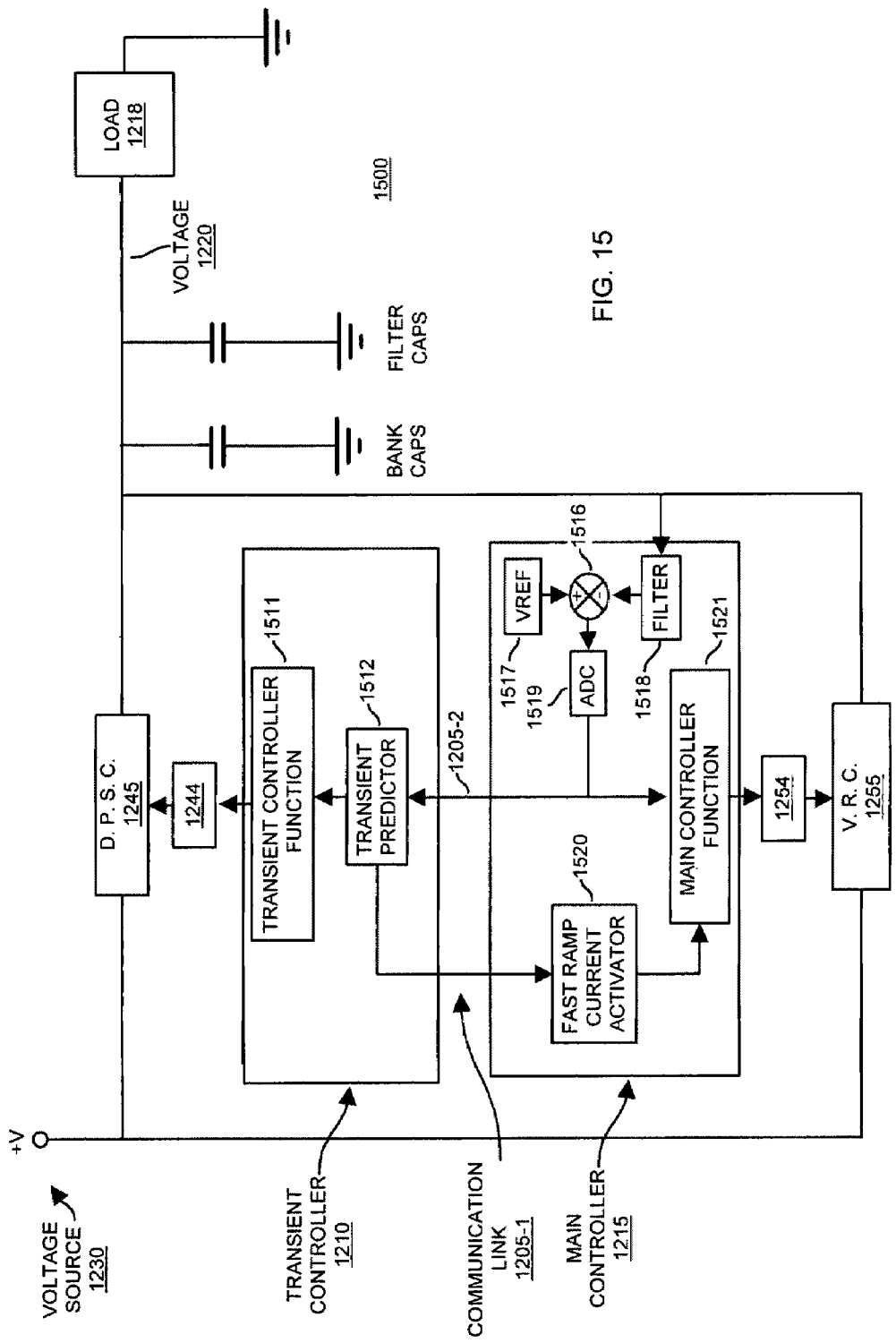
FIG. 15 is a detailed diagram of a transient controller and main controller in a power supply system according to embodiments herein.

FIG. 15 is a diagram of power supply system 1500 according to embodiments herein. In such an embodiment, the transient controller 1210 includes transient controller function 1511 and transient predictor circuit 1512. Main controller 1215 includes voltage reference 1517, filter 1518, differential amplifier 1516, analog to digital converter 1519, fast ramp current activator 1520, and main controller function 1521.

Communication link 1205 (e.g., communication link 1205-1 and communication link 1205-2) enables communications between transient controller 1210 and main controller 1215.

Transient controller function 1511 provides control signals to one or more drivers 1244. Driver 1244 drive corresponding elements such as switches in dynamic power supply circuit 1245.

Main controller function 1521 provides control signals to one or more drivers 1254. Drivers 1254 drive corresponding elements such as switches in voltage regulator circuit 1255.

Now, more particularly, during operation, differential amplifier 1516 receives voltage 1220 input from filter 1518 (e.g., a low pass filter) as well as voltage reference 1517 such as a 1.5 volts DC reference input. Analog to digital converter 1519 initiates repeated sampling of the output produced by different amplifier 1516. Analog to digital converter 1519 forwards sampling data (e.g., control information) to main controller function 1521 and transient predictor circuit 1512 (over communication link 1205-2). Note that voltage reference 1517, analog to digital converter 1519, and filter 1518 can be alternatively located or duplicated in transient controller 1210.

Transient predictor circuit 1512 monitors the difference voltage produced by differential amplifier 1516 and detects occurrence of transient conditions in which voltage 1220 rapidly increases or decreases from a nominal value such as 1.5 volts. In response to sensing a transient condition, the transient predictor circuit can notify transient controller function 1511 for purposes of activating dynamic power supply circuit 1245. In other words, in response to detecting a transient condition, the transient controller function 1511 turns ON a switch in the dynamic power supply circuit 1245 to convey power from voltage source 1230 to load 1218.

The transient predictor circuit 1512 (e.g., transient detection circuit) can be configured to notify fast ramp current activator 1520 of detected transient conditions by communicating over communication link 1205-1 to main controller 1215. In response to receiving notification over communication link 1205-1, the fast ramp current activator 1520 initiates modification of a current operating mode of main controller function 1521. For example, the fast ramp current activator 1520 can force the main controller function 1521 into a mode in which two or more of multiple phases of voltage regulator circuit 1255 are actively driven to simultaneously convey power from voltage source 1230 to load 1218. As described herein, before and after the transient condition, the main controller function 1521 can regulate voltage 1220 based on feedback (e.g., continuous sampling of data) provided by analog to digital converter 1519 without the aid of dynamic power supply circuit 1245.

Thus, one embodiment herein includes a power supply system in which the transient controller 1210 is configured to generate a respective control signal to the dynamic power supply circuit 1245 to increase (e.g., from no power to a known amount of power) power delivered by the dynamic power supply circuit first power converter circuit to the load during the transient condition. In such an embodiment, the main controller 1215 can be configured to receive the control information over communication link 1205 and, in response to receiving the control information (e.g., differential voltage signal from analog to digital converter 1519), generate a respective control signal driving voltage regulator circuit 1255 to increase an amount of power delivered by the dynamic power supply circuit 1255 to the load 1218 during the transient condition.

For example, during non-transient conditions, when the dynamic power supply circuit 1245 is deactivated, the voltage regulator circuit 1255 can be driven by main controller function 1521 such that only a single one of multiple phases in the voltage regulator circuit 1255 is activated at a time to convey power from voltage source 1230 to the load 1218. Even though the transient controller 1210 controls the dynamic power supply circuit 1245 to be in a stand-by mode during non-transient conditions, the transient controller 1210 can monitor (via transient predictor circuit 1512) changes in the output voltage 1220 produced by the voltage regulator circuit 1255.

During occurrence of a transient condition when the transient predictor circuit 1512 detects a transient condition when load instantaneously requires more or less current/power, the transient controller function 1210 activates the dynamic power supply circuit 1245 to provide current/power to the load 1218. In response to receiving the notification of such a condition over communication link 1205-1, the main controller 1215 can initiate activation of multiple phases of the voltage regulator circuit 1255 at the same time to boost a rate of providing power from voltage source 1230 to loads 1218. In other words, the main controller function 1521 can produce a certain set of control signals to regulate voltage 1220 during non-transient conditions. The main controller function 1521 can be configured to adjust operation based on detection of the transient condition such that the main controller function drives voltage regulator circuit 1255 with control signals to increase a delivery of power to the load during the transient condition. In one embodiment, the main controller function is configured to receive the control information over communication link 1205-1 and, in response to receiving the control information, simultaneously activate two or more of multiple power converter phases associated with the voltage regulator circuit 1255 to deliver more power to the load 1218 during at least a portion of the transient condition when the dynamic power supply circuit 1245 also delivers power to the load 1218.

Note that transient predictor circuit 1512 can be configured to monitor the differential voltage produced by analog to digital converter 1519 and initiate corrective actions to prevent over-voltage and under-voltage conditions. For example, the transient controller 1210 can be configured such that the dynamic power supply circuit 1245 delivers current to the load during the transient condition when the load requires an instantaneous amount of power greater than a threshold value. The transient controller 1210 can be configured such that the transient controller 1210 produces respective control signals to disable the dynamic power supply circuit 1245 from delivering power to the load during non-transient conditions when the load requires an instantaneous amount of current less than the threshold value. Of course, the transient predictor circuit 1512 can initiate corrective action in response to the transient condition as previously discussed such as detecting a change in the differential voltage over time in order to predict how long to activate dynamic power supply circuit 1245.

Figure 16:
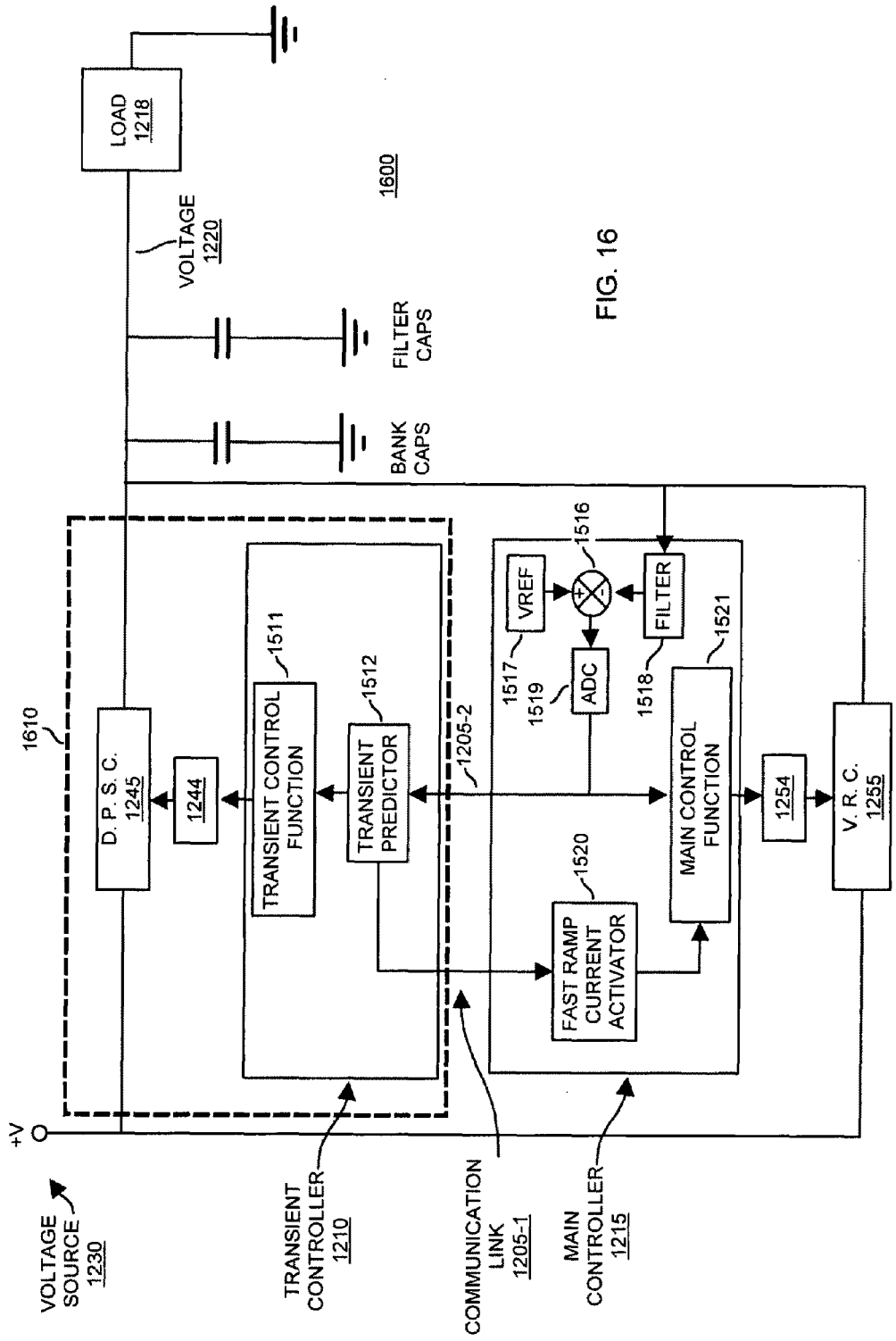
FIG. 16 is a diagram illustrating packaging of a transient controller, corresponding drivers, and a dynamic power supply circuit according to embodiments herein.

FIG. 16 is a diagram illustrating packaging of transient controller 1210 and related circuits according to embodiments herein. As shown, the transient controller 1210, drivers 1244, and dynamic power supply circuit 1245 can be packaged as power supply circuit 1610 such as a monolithic integrated circuit or a hybrid integrated circuit. Any inductors (e.g., energy storage devices) associated with dynamic power supply circuit 1245 can be optionally provided internal or external to power supply circuit 1610. Thus, the power supply circuit 1610 can be a single integrated circuit package for placement on a corresponding perforated circuit board in lieu of using discrete components to provide the functionality as discussed above. Such an embodiment can save printed circuit board real estate and thus reduce overall circuit size.

Figure 17:
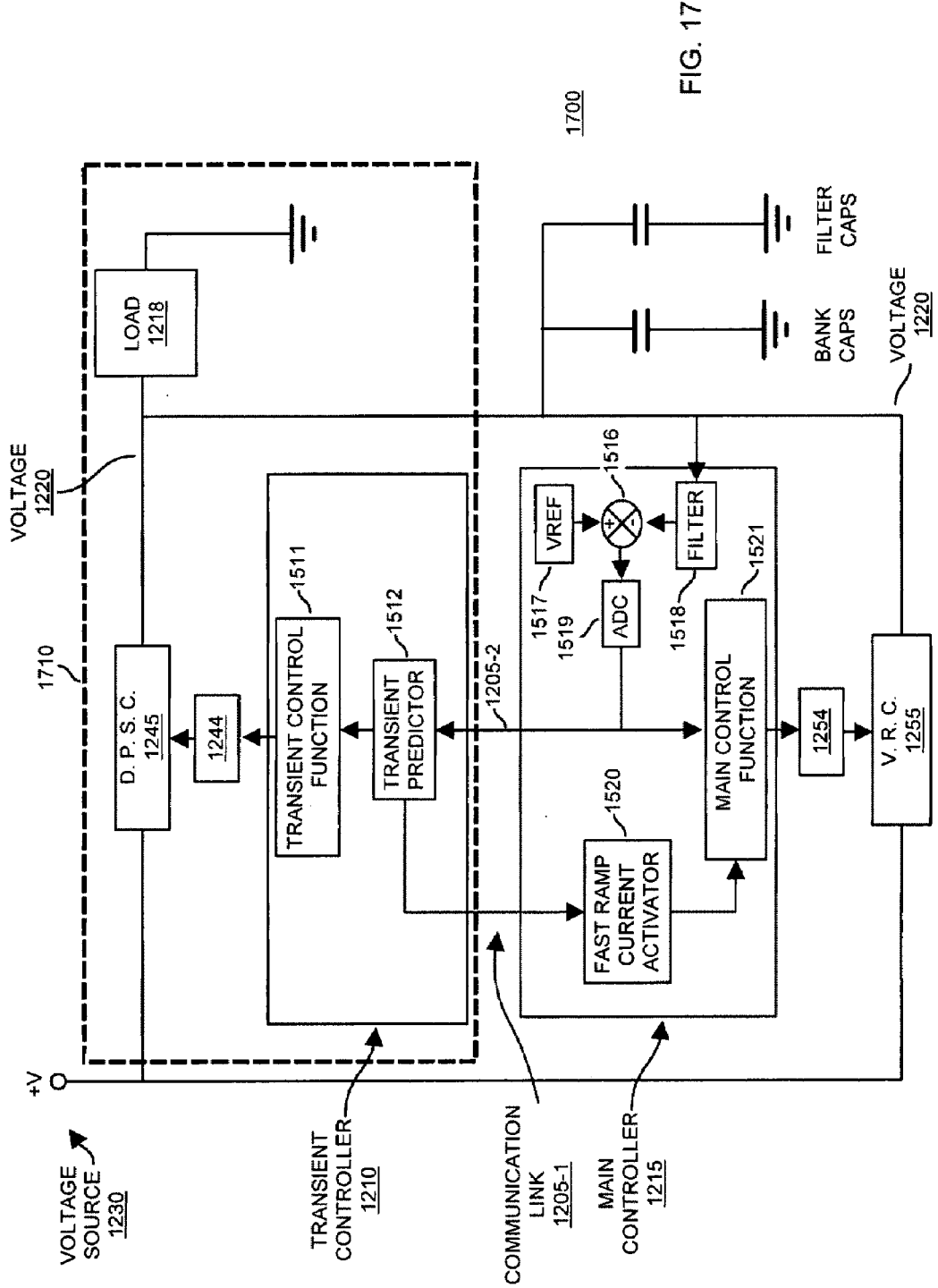
FIG. 17 is a diagram illustrating packaging of a transient controller, corresponding drivers, a dynamic power supply circuit and a corresponding load according to embodiments herein.

FIG. 17 is a diagram illustrating packaging of transient controller 1210 and related circuits according to embodiments herein. As shown, the transient controller 1210, drivers 1244, dynamic power supply circuit 1245 as well as load (e.g., a semiconductor device such as a microprocessor chip whose load requirements constantly changes over time) can be packaged as circuit 1710 such as a monolithic integrated circuit or a hybrid integrated circuit. Any inductors (e.g., energy storage devices) associated with dynamic power supply circuit 1245 can be optionally provided internal or external to circuit 1710. Thus, the circuit 1710 can be a single integrated circuit package for placement on a corresponding perforated circuit board in lieu of discrete components to provide the functionality as discussed above. Such an embodiment can also save printed circuit board real estate and thus reduce overall circuit size.

Figure 18:
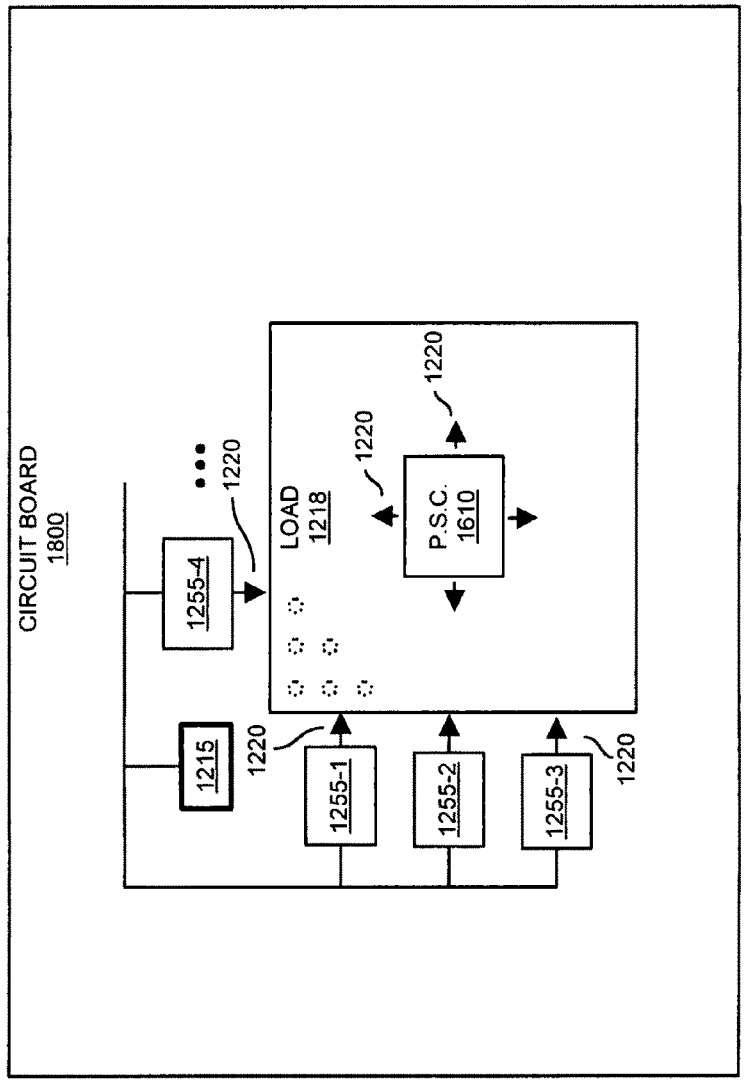
FIG. 18 is a diagram illustrating a topology view of a corresponding circuit board including a power supply system according to embodiments herein.

FIG. 18 is a diagram illustrating a circuit board 1800 and corresponding power supply system according to embodiments herein. As shown, circuit board 1800 (e.g., a multi-layered perforated circuit board) can include a load 1218 such as a microprocessor. As previously discussed, each of the different phases (e.g., phase 1255-1, phase 1255-2, phase 1255-3, . . . ) of voltage regulator circuit 1255 receives a corresponding set of control signals from main controller 1215 so that the voltage regulator circuit 1255 produces a substantially constant output voltage for powering load 1218. The power supply circuit 1610 (or circuit 1710 as the case may be), residing at a core of load 1218, also can deliver power via (continuous or occasional) generation of a substantially constant voltage 1220.

In one embodiment, a portion (e.g., potentially a bulk) of the power provided to load 1218 can be received from the multiple phases of voltage regulator circuit 1255. As previously discussed, power requirements of the load 1218 can change over time. For example, when a transient condition occurs, the power supply circuit 1610 senses the condition and responds by activating dynamic power supply circuit 1245 in power supply circuit 1610.

Load 1218 can be configured in a number of different ways for mounting to circuit board 1800. For example, the load 1218 can be packaged in a surface mount package (e.g., land grid array, ball grid array, leadless chip carrier, J-lead,) and through hole type package (e.g., dual in-line packages, etc.).

Based on the layout of the circuit board 1800 as shown, the voltage regulator circuit 1255 provides power from an outside periphery of the load 1218 (e.g., external physical edges of the load) to a core of the load 1218. The power supply circuit 1610 (as discussed above in FIG. 16) can be disposed in a cavity of load 1218 to provide power from a core region outward to (e.g., a location internal to the external physical edges of the load 1218) of load 1218.

In a hybrid integrated circuit application, the load 1218 can be a microprocessor system including a cavity located internal to the periphery of load 1218 for placement of power supply circuit 1610. In another embodiment such as a monolithic integrated circuit, the power supply circuit 1610 can be integrated with load 1218 so that a combination of load 1218 and power supply circuit 1610 are provided as circuit 1710 in FIG. 17.

In either case, the power supply circuit receives input voltage from voltage source 1230 from a (low impedance) connection between the load 1218 (e.g., a chip) and the circuit board 1800. In one embodiment, the power supply circuit 1610 receives input voltage directly beneath the load 1218, produces the output voltage 1220, and delivers such power outward from the core of load 1218 outward towards load 1218 (as opposed to voltage regulator circuit 1255 which delivers power from a periphery of load 1218 to the core of load 1218).

A benefit of placing power supply circuit 1610 (or parts thereof) in the same housing as load 1218 is the ability to quickly provide clean power to the load. For example, on-board production of power from the power supply circuit 1610 (or power supply circuit 1710 as the case may be) to load 1218 enables quicker delivery of power because the conductive paths for delivery of power within load 1218 have a relatively small inductance compared to associated with external paths used for delivering power from voltage regulator circuit 1255 through solder joints, pins, contacts, etc. towards the core of load 1218.

Note that main controller 1215 can be implemented as an adaptive type of controller as previously discussed. The power supply circuit 1610 can include a predictive controller (e.g., transient controller 1210 can be a predictive controller) that monitors voltage 1220 and, depending on a change in voltage 1220 over time, initiates activation of dynamic power supply circuit 1245 to compensate for instantaneous changes in power consumption.

In addition to or in lieu of monitoring a change in voltage 1220 over time, the transient controller 1210 in power supply circuit 1610 can be configured to receive an input signal produced by the load itself. This signal can indicate how much power will be needed to compensate for a occurrence of a present or future power draw that will occur when the load 1218 performs a certain operation requiring extra power that cannot be delivered fast enough by voltage regulator circuit 1255 external to load 1218. Accordingly, one embodiment herein includes an adaptive controller (e.g., main controller 1215) that initiates delivery of respective generated power (e.g., regulated power) from an external location inward towards a core of a respective load while a predictive controller (e.g., transient controller 1210 in power supply circuit 1610) initiates delivery of respective generated power (e.g., regulated power) from a core location outward to a respective load.

Although there are a number of ways to implement functionality associated with transient controller 1210 in power supply circuit 1610, one way to implement application of instantaneous power delivery to the load via dynamic power supply circuit 1245 is to implement a look-up table. In such an embodiment, the power supply circuit 1610 selectively activates (e.g., sets switching patterns, overall time durations, etc.) the dynamic power supply circuit 1245 therein to account for extra power required by load 1218.

Another benefit of placing power supply circuit 1610 or circuit 1710 in close proximity to the load 1218 is the ability to carry out functionality associated with transient controller 1210 via control resources associated with the load 1218. For example, as previously discussed, the load 1218 can be a microprocessor. The transient controller and/or dynamic power supply circuit can be a power supply system in which the transient controller 1210 and/or dynamic power supply circuit 1245 is integrated onto a semiconductor circuit substrate of the microprocessor (e.g., load 1218). Accordingly, the load 1218 can be a microprocessor including a detection circuit configured to detect current or future transient conditions (e.g., a sudden needs for delivery of more or less current/power required by the load 1218).

As shown in FIG. 18, the main controller 1215 and corresponding voltage regulator circuit 1255 can be located at an external location (e.g., off-chip) with respect to the load 1218 such as microprocessor. In such an embodiment, the microprocessor can locally execute code to carry out the functionality associated with the transient controller 1210 to activate dynamic power supply circuit 1245 when necessary. Accordingly, the load 1218 by itself can be configured to participate in the delivery of power to itself while also performing other processing functions.

Figure 19:
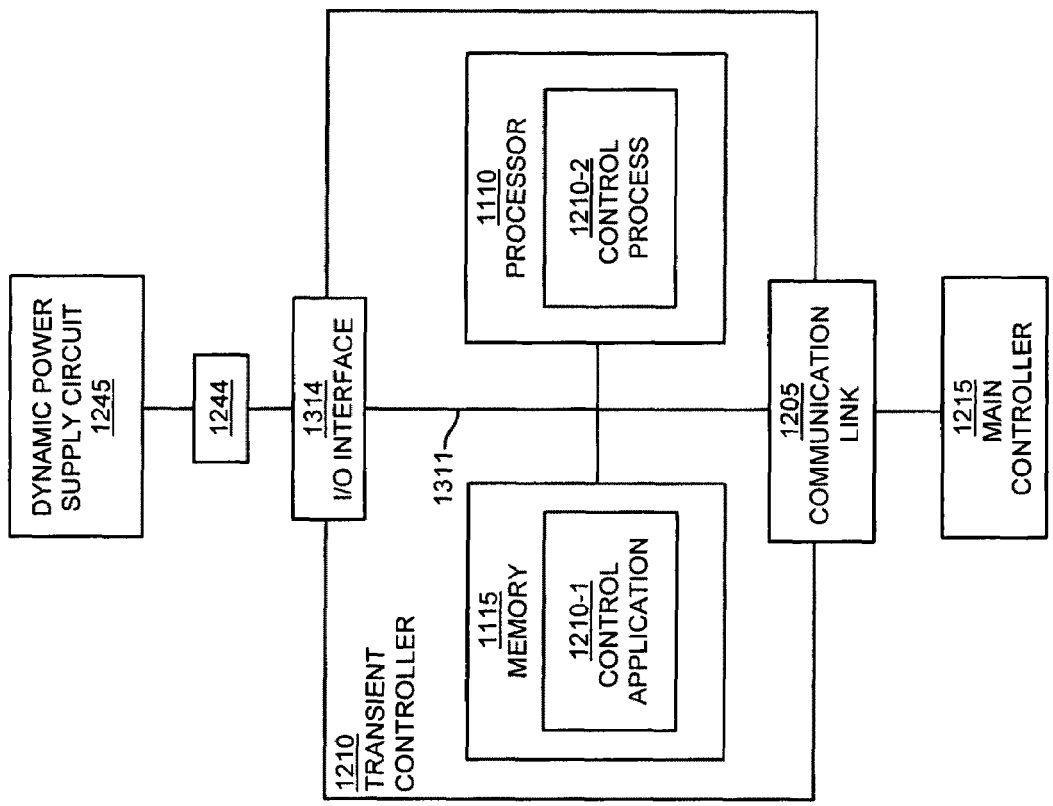
FIG. 19 is a diagram illustrating details associated with an example transient controller according to embodiments herein.

FIG. 19 is a block diagram of an example architecture of transient controller 1210 according to embodiments herein. Transient controller 1210 can be a DSP (Digital Signal Processor), FPGA (Field Programmable Gate Array), microcontroller, etc. Note that main controller 1215 can be executed on a similar architecture.

As shown, transient controller 1210 of the present example includes an interconnect 1311 that couples a memory system 1115, a processor 1110, I/O interface 1314 (e.g., a driver interface), and communication link 1205. As previously discussed, communication link 1205 can be used to receive and send information to main controller 1215.

As shown, memory system 1115 can be encoded with one or more control applications 1210-1 (e.g., control laws or rules) that enables transient controller 1210 to support the functionality as described herein. Accordingly, control application 1210-1 can be embodied as software code such as data and/or logic instructions (e.g., code stored in the memory or on another computer readable medium such as a disk) that supports processing functionality according to different embodiments described herein.

During operation of one embodiment, the transient controller 1210 accesses memory system 1115 via the use of interconnect 1311 in order to launch, run, execute, interpret or otherwise perform the logic instructions of the control application 1210-1. Execution of the control application 1210-1 produces processing functionality in control process 1210-2. In other words, the control process 1210-2 represents one or more portions of the control application 1210-1 performing within or upon the transient controller 1210.

It should be noted that, in addition to the control process 1210-2 can carry out method operations as discussed herein, other embodiments herein include the control application 1210-1 itself (i.e., the un-executed or non-performing logic instructions and/or data). The control application. 1210-1 may be stored on a computer readable medium (e.g., a repository) such as a floppy disk, hard disk or in an optical medium. According to other embodiments, the control application 1210-1 can also be stored in a memory type system such as in firmware, read only memory (ROM), or, as in this example, as executable code within the memory system 1115 (e.g., within Random Access Memory or RAM).

Functionality supported by controller circuit 1206 (e.g., either or both of main controller 1215 and transient controller 1210) will now be discussed via flowchart 2000 in FIG. 20. For purposes of the following discussion, the transient controller circuit 1210 generally performs steps in the flowchart. Note that there will be some overlap with respect to concepts discussed above. Also, note that the steps in the below flowcharts need not always be executed in the order shown.

Figure 20:
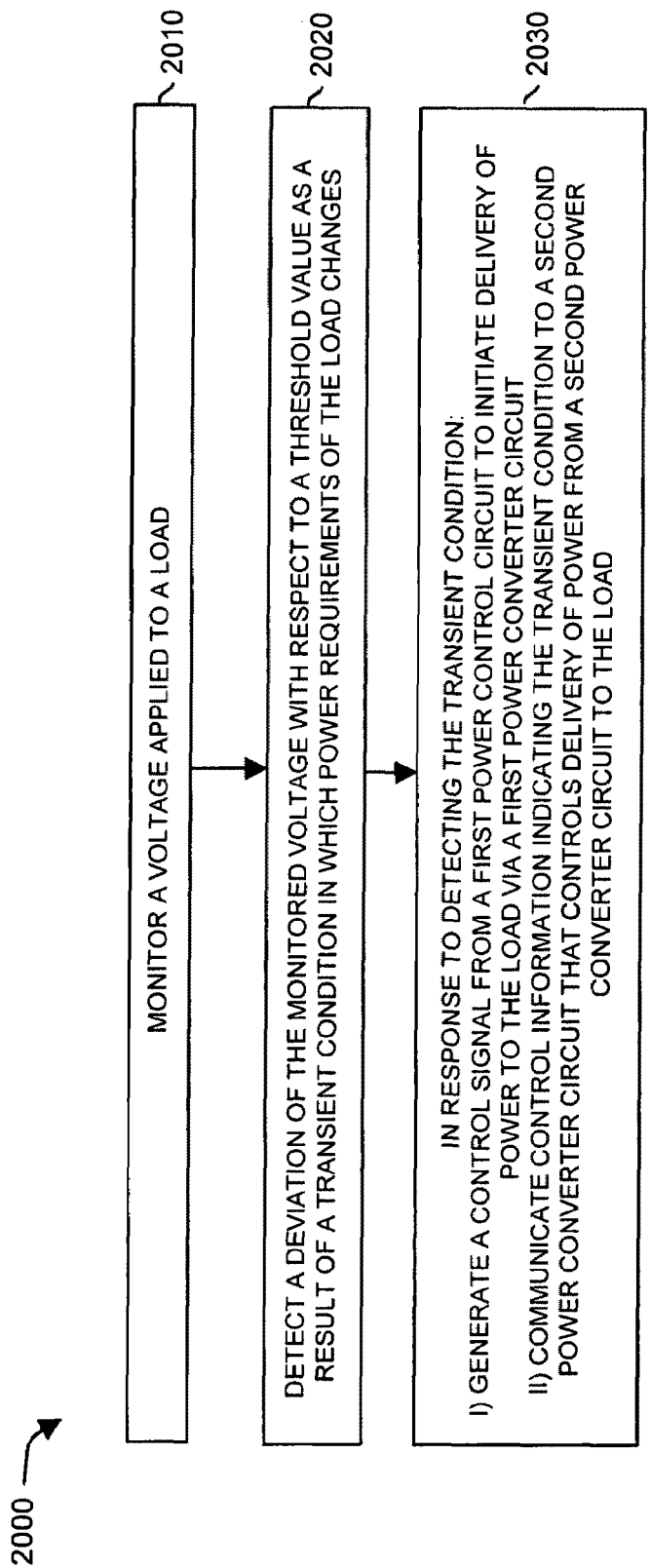
FIG. 20 is an example flowchart depicting operations performed by a transient controller according to embodiments herein.

FIG. 20 is a flowchart 2000 illustrating a technique of supplying power according to embodiments herein.

In step 2010, the transient controller 1210 (e.g., a first power control circuit) monitors a voltage (e.g., based on the differential voltage produced by analog to digital converter 1519) applied to load 1218.

In step 2020, assume that the transient controller 1210 detects a deviation of the monitored voltage with respect to a threshold value as a result of a transient condition in which power requirements of the load 1218 changes.

In step 2030, in response to detecting the transient condition, the transient controller 1210:

i) generates a control signal to one or more drivers 1244 (which in turn drive switches in dynamic power supply circuit 1244) to initiate delivery of power from the voltage source 1230 to the load 1218. Detecting a large enough deviation or trend (e.g., change in voltage over time) of the voltage 1220 relative to a reference voltage prompts the transient controller 1210 to activate a delivery of power from the dynamic power supply circuit 1245 to the load 1218 during the transient condition, after which the transient controller 1210 initiates deactivation of the dynamic power supply circuit 1245 from delivering power to the load 1218.

ii) communicates control information (over communication link 1205-1) to main controller 1215 indicating the transient condition. Receipt of the control information (e.g., occurrence of the transient condition) by the main controller 1215 can prompt the main controller 1215 to increase the delivery of power from the voltage regulator circuit 1255 to the load 1218.

Figure 21:
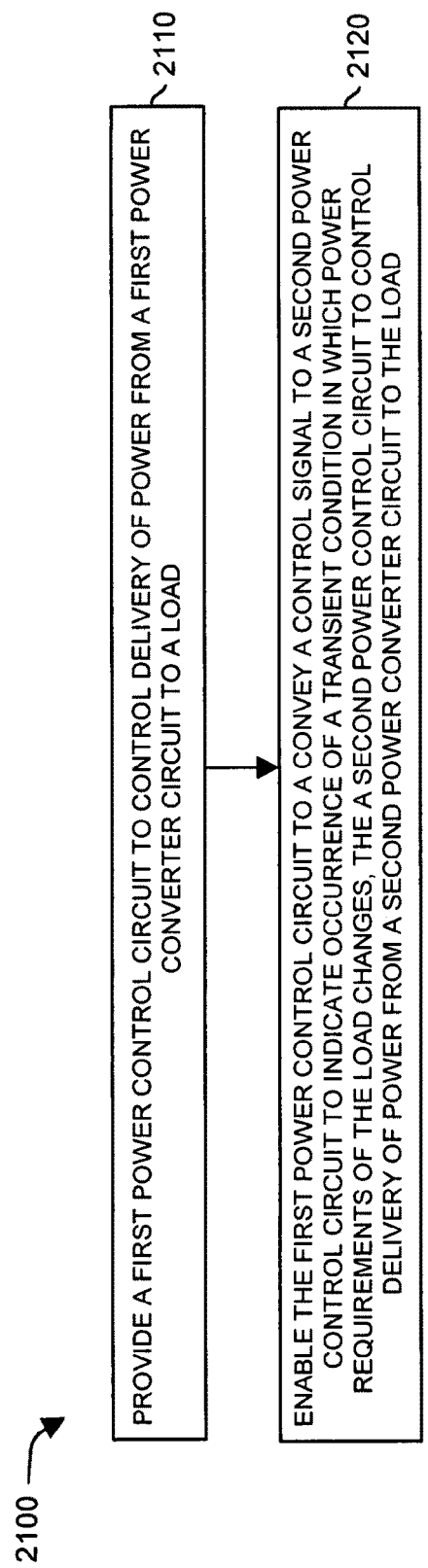
FIG. 21 is an example flowchart illustrating use of a transient controller according to embodiments herein.

FIG. 21 is a flowchart 2100 illustrating a technique of supplying power according to embodiments herein.

In step 2110, a circuit board manufacturer provides a first power control circuit (e.g., transient controller 1210) to control delivery of power from a first power converter circuit (e.g., dynamic power supply circuit 1245) to a load 1218.

In step 2120, the circuit board manufacturer enables the first power control circuit (e.g., the transient controller 1210) to a convey a control signal over communication link 1205 to a second power control circuit (e.g., main controller 1215) to indicate occurrence of a transient condition in which power requirements of the load 1218 changes. The first power control circuit (e.g., the transient controller 1210) is configured to increase an amount of power delivered by the first power converter circuit to the load 1218 during the transient condition. The second power control circuit (e.g., the main controller) is configured to adjust operation of the second power converter circuit (e.g., the voltage regulator circuit 1255) and delivery of power to the load 1218 during the transient condition in response to receiving the control signal.

Note that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A power supply system including:
a first power control circuit configured to control delivery of power from a first power converter circuit to a load;
the first power control circuit configured to convey control information to a second power control circuit, the control information indicating a transient condition in which power requirements of the load changes, the second power control circuit configured to control delivery of power from a second power converter circuit to the load;
wherein the first power control circuit is configured to generate a respective control signal to the first power converter circuit to increase an amount of power delivered by the first power converter circuit to the load during the transient condition; and
wherein the second power control circuit is configured to receive the control information and, in response to receiving the control information, generate a respective control signal to increase an amount of power delivered by the second power converter circuit to the load during the transient condition.

2. A power supply system as in claim 1, wherein the first power control circuit is configured to generate the control information.

3. A power supply system as in claim 1 further comprising:
a communication link for conveying the control information from the first power control circuit to the second power control circuit, the control information indicating the transient condition.

4. A power supply system as in claim 2, wherein the first power control circuit includes a transient predictor circuit configured to:

monitor changes in a common output voltage produced by the first power converter circuit and the second power converter circuit operating in parallel;
detect the occurrence of the transient condition based on the changes in the common output voltage; and
produce the control information in response to detection of the changes in the common output voltage.

5. A power supply system as in claim 3, wherein the control information conveyed over the communication link indicates the transient condition and need for the second power control circuit to modify delivery of power from the second power converter circuit to the load.

6. A power supply system as in claim 1, wherein the second power control circuit is configured to adjust operation of the second power converter circuit and adjust delivery of power to the load during the transient condition in response to receiving the control information.

7. A power supply system as in claim 1, wherein the second power converter circuit includes multiple power converter phases in parallel to deliver power to the load and the second power control circuit provides control signals to the multiple power converter phases;
wherein the first power control circuit includes a transient detection circuit to identify characteristics of, the transient condition and produce the control information; and
wherein the second power control circuit is configured to receive the control information and, in response to receiving the control information, modify operation of the multiple power converter phases and delivery of power to the load.

8. A power supply system including:
a first power control circuit configured to control delivery of power from a first power converter circuit to a load;
the first power control circuit configured to convey control information to a second power control circuit, the control information indicating a transient condition in which power requirements of the load changes, the second power control circuit configured to control delivery of power from a second power converter circuit to the load; and
wherein the second power converter circuit is configured to receive the control information over a communication link and, in response to receiving the control information, simultaneously activate at least two of multiple power converter phases to deliver power to the load during at least a portion of the transient condition when the first power converter circuit also delivers power to the load.

9. A power supply system as in claim 1, wherein the first power control circuit and the first power converter circuit are integrated into a monolithic integrated circuit device.

10. A power supply system as in claim 1, wherein the first power converter circuit and the first power control circuit are integrated into a hybrid integrated circuit device.

11. A power supply system as in claim 1, wherein the load is a semiconductor device whose power requirements change over time.

12. A power supply system as in claim 11, wherein the semiconductor device, the first power control circuit, and the first power converter circuit are integrated together as a hybrid integrated circuit.

13. A power supply system as in claim 11, wherein the semiconductor device, the first power control circuit, and the first power converter circuit are integrated together as a monolithic integrated circuit.

14. A power supply system as in claim 11, wherein the semiconductor device is a microprocessor; and wherein the microprocessor, the first power control circuit, and the first power converter circuit are integrated together as a hybrid integrated circuit.

15. A power supply system including:
a first power control circuit configured to control delivery of power from a first power converter circuit to a load;
the first power control circuit configured to convey control information to a second power control circuit, the control information indicating a transient condition in which power requirements of the load changes, the second power control circuit configured to control delivery of power from a second power converter circuit to the load; and
wherein the first power control circuit is configured to enable the first power converter circuit to deliver power to the load during the transient condition when the load requires an instantaneous amount of power greater than a threshold value and the first power control circuit is configured to disable the first power converter from delivering power to the load during non-transient conditions when the load requires an instantaneous amount of power less than the threshold value.

16. A method comprising:
providing a first power control circuit to control delivery of power from a first power converter circuit to a load; and
enabling the first power control circuit to a convey a control signal to a second power control circuit to indicate occurrence of a transient condition in which power requirements of the load changes, the a second power control circuit to control delivery of power from a second power converter circuit to the load,
configuring the first power control circuit to:
reduce an amount of power delivered by the first power converter circuit to the load during the transient condition when the power requirements of the load decreases; and
convey the control signal to the second power control circuit to indicate the decreased power requirements of the load, the conveyed control signal prompting the second power control circuit to initiate a reduction of an amount of power delivered by the second power converter circuit to the load.

17. A method as in claim 16 further comprising:
configuring the first power control circuit to increase an amount of power delivered by the first power converter circuit to the load during the transient condition.

18. A method as in claim 16 further comprising:
providing a communication link for conveying the control signal from the first power control circuit to the second power control circuit, the control signal indicating occurrence of the transient condition.

19. A method as in claim 16 further comprising:
configuring the second power control circuit to adjust operation of the second power converter circuit and delivery of power to the load during the transient condition in response to receiving the control signal.

20. A method comprising:
providing a first power control circuit to control delivery of power from a first power converter circuit to a load;
enabling the first power control circuit to a convey a control signal to a second power control circuit to indicate occurrence of a transient condition in which power requirements of the load changes, the a second power control circuit to control delivery of power from a second power converter circuit to the load;
configuring the second power converter circuit to include multiple power converter phases in parallel to deliver power to the load and provide control signals to the multiple power converter phases;
configuring the first power control circuit to include a transient detection circuit to identify characteristics of the transient condition and produce the control signal;
configuring the second power control circuit to receive the control signal and, in response to receiving the control signal, modify operation of the multiple power converter phases; and
configuring the second power converter circuit to receive the control signal over a communication link and, in response to receiving the control signal, simultaneously activate at least two phases of the multiple power converter phases associated with the second power converter circuit to simultaneously deliver power to the load during at least a portion of the transient condition.

21. A method as in claim 16 further comprising:
providing the first power control circuit and the first power converter circuit as a monolithic integrated circuit device.

22. A method as in claim 16 further comprising:
providing the first power converter circuit and the first power control circuit as a hybrid integrated circuit device.

23. A method as in claim 16 further comprising:
providing the load as a semiconductor device whose power requirements change over time.

24. A method as in claim 23 further comprising:
providing the semiconductor device, the first power control circuit, and the first power converter circuit as a hybrid integrated circuit device.

25. A method as in claim 16 further comprising:
providing the load, the first power control circuit, and the first power converter circuit as a monolithic integrated circuit device.

26. A method as in claim 16 further comprising:
providing the load, the first power control circuit, and the first power converter circuit as a monolithic integrated circuit device, the load being a microprocessor on the monolithic integrated circuit.

27. A method as in claim 16 further comprising:
configuring the first power control circuit to control the first power converter circuit deliver power to the load during the transient condition when the load requires an instantaneous amount of power greater than a threshold value; and
configuring the first power control circuit to disable the first power converter from delivering power to the load during non-transient conditions when the load requires an instantaneous amount of power less than the threshold value.

28. A method as in claim 16 further comprising:
configuring the first power control circuit to sink excess power being delivered by the second power converter circuit to the load during the transient condition in which the power requirements of the load decreases.

29. A method as in claim 16 further comprising:
configuring the first power control circuit to detect the transient condition based on receiving communications from the load, which is a microprocessor that predicts the transient condition.

30. A power supply system as in claim 1, wherein the first power control circuit is integrated onto a semiconductor circuit substrate of the load.

31. A power supply system as in claim 30, wherein the load is a microprocessor configured to detect the transient condition and notify the first power control circuit of the transient condition.

32. A power supply system as in claim 31, wherein the second power control circuit is located at an external location with respect to the load.

33. A power supply system including:

a first power control circuit configured to control delivery of power from a first power converter circuit to a load;

the first power control circuit configured to convey control information to a second power control circuit, the control information indicating a transient condition in which power requirements of the load changes the second power control circuit configured to control delivery of power from a second power converter circuit to the load; and wherein the first power control circuit is configured to: reduce an amount of power delivered by the first power converter circuit to the load during the transient condition when the power requirements of the load decreases as well as convey the control signal to the second power control circuit to indicate the decreased power requirements of the load, the conveyed control signal to the second power control circuit prompting the second power control circuit to initiate a reduction of an amount of power delivered by the second power converter circuit to the load.

34. A power supply system as in claim 1, wherein the first power control circuit is configured to sink excess power being delivered by the second power converter circuit to the load during the transient condition in which the power requirements of the load decreases.

* * * * *